United States Patent
Boutros et al.

(10) Patent No.: US 11,038,782 B2
(45) Date of Patent: *Jun. 15, 2021

(54) DETECTING FAILURE OF LAYER 2 SERVICE USING BROADCAST MESSAGES

(71) Applicant: Nicira, Inc., Palo Alto, CA (US)

(72) Inventors: Sami Boutros, Union City, CA (US); Stephen Tan, San Jose, CA (US); Rahul Mishra, Mountain View, CA (US); Kantesh Mundaragi, Pune (IN); Jayant Jain, Cupertino, CA (US); Akhila Naveen, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,868

(22) Filed: Aug. 1, 2020

(65) Prior Publication Data
US 2020/0366584 A1  Nov. 19, 2020

Related U.S. Application Data

(63) Continuation of application No. 15/937,621, filed on Mar. 27, 2018, now Pat. No. 10,805,192.

(51) Int. Cl.
*H04L 12/26* (2006.01)
*H04L 12/24* (2006.01)

(52) U.S. Cl.
CPC ...... *H04L 43/0805* (2013.01); *H04L 41/0668* (2013.01); *H04L 43/10* (2013.01)

(58) Field of Classification Search
CPC ....... H04L 45/66; H04L 49/30; H04L 49/354; H04L 12/66; H04L 45/56; H04L 43/0805; H04L 43/10; H04L 41/0668
(Continued)

(56) References Cited

U.S. PATENT DOCUMENTS 6,006,264 A  12/1999  Colby et al.
6,104,700 A   8/2000  Haddock et al.
(Continued)

FOREIGN PATENT DOCUMENTS

CN    1689369 A   10/2005
CN  101594358 A   12/2009
(Continued)

OTHER PUBLICATIONS

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
(Continued)

*Primary Examiner* — Gbemileke J Onamuti
(74) *Attorney, Agent, or Firm* — Adeli LLP

(57) ABSTRACT

Some embodiments provide a method for detecting a failure of a layer 2 (L2) bump-in-the-wire service at a device. In some embodiments, the device sends heartbeat signals to a second device connected to L2 service nodes in order to detect failure of the L2 service (e.g., a failure of all the service nodes). In some embodiments, the heartbeat signals are unidirectional heartbeat signals (e.g., a unidirectional bidirectional-forwarding-detection (BFD) session) sent from each device to the other. The heartbeat signals, in some embodiments, use a broadcast MAC address in order to reach the current active L2 service node in the case of a failover (i.e., an active service node failing and a standby service node becoming the new active service node). The unidirectional heartbeat signals are also used, in some embodiments, to decrease the time between a failover and data messages being forwarded to the new active service node.

16 Claims, 14 Drawing Sheets

(58) Field of Classification Search
USPC .......................................................... 370/217
See application file for complete search history.

(56) References Cited

U.S. PATENT DOCUMENTS

| | | |
|---|---|---|
| 6,154,448 A | 11/2000 | Petersen et al. |
| 6,772,211 B2 | 8/2004 | Lu et al. |
| 6,779,030 B1 | 8/2004 | Dugan et al. |
| 6,826,694 B1 | 11/2004 | Dutta et al. |
| 6,880,089 B1 | 4/2005 | Bommareddy et al. |
| 6,985,956 B2 | 1/2006 | Luke et al. |
| 7,013,389 B1 | 3/2006 | Srivastava et al. |
| 7,209,977 B2 | 4/2007 | Acharya et al. |
| 7,239,639 B2 | 7/2007 | Cox et al. |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,649,890 B2 | 1/2010 | Mizutani et al. |
| 7,698,458 B1 | 4/2010 | Liu et al. |
| 7,818,452 B2 | 10/2010 | Matthews et al. |
| 7,898,959 B1 | 3/2011 | Arad |
| 7,948,986 B1 | 5/2011 | Ghosh et al. |
| 8,078,903 B1 | 12/2011 | Parthasarathy et al. |
| 8,094,575 B1 | 1/2012 | Vadlakonda et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,230,493 B2 | 7/2012 | Davidson et al. |
| 8,266,261 B2 | 9/2012 | Akagi |
| 8,339,959 B1 | 12/2012 | Moisand et al. |
| 8,451,735 B2 | 5/2013 | Li |
| 8,484,348 B2 | 7/2013 | Subramanian et al. |
| 8,488,577 B1 | 7/2013 | Macpherson |
| 8,521,879 B1 | 8/2013 | Pena et al. |
| 8,615,009 B1 | 12/2013 | Ramamoorthi et al. |
| 8,707,383 B2 | 4/2014 | Bade et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukuri et al. |
| 8,868,711 B2 | 10/2014 | Skjolsvold et al. |
| 8,873,399 B2 | 10/2014 | Bothos et al. |
| 8,874,789 B1 | 10/2014 | Zhu |
| 8,892,706 B1 | 11/2014 | Dalal |
| 8,914,406 B1 | 12/2014 | Haugsnes et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,191,293 B2 | 11/2015 | Iovene et al. |
| 9,203,748 B2 | 12/2015 | Jiang et al. |
| 9,225,638 B2 | 12/2015 | Jain et al. |
| 9,225,659 B2 | 12/2015 | McCanne et al. |
| 9,232,342 B2 | 1/2016 | Seed et al. |
| 9,258,742 B1 | 2/2016 | Pianigiani et al. |
| 9,264,313 B1 | 2/2016 | Manuguri et al. |
| 9,277,412 B2 | 3/2016 | Freda et al. |
| 9,397,946 B1 | 7/2016 | Yadav |
| 9,407,540 B2 | 8/2016 | Kumar et al. |
| 9,407,599 B2 | 8/2016 | Koponen et al. |
| 9,419,897 B2 | 8/2016 | Cherian et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,577,845 B2 | 2/2017 | Thakkar et al. |
| 9,602,380 B2 | 3/2017 | Strassner |
| 9,660,905 B2 | 5/2017 | Dunbar et al. |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,749,229 B2 | 8/2017 | Previdi et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 10,013,276 B2 | 7/2018 | Fahs et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,636 B2 | 11/2018 | Jiang et al. |
| 10,135,737 B2 | 11/2018 | Jain et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,397,275 B2 | 8/2019 | Jain et al. |
| 10,516,568 B2 | 12/2019 | Jain et al. |
| 10,547,692 B2 | 1/2020 | Salgueiro et al. |
| 10,594,743 B2 | 3/2020 | Hong et al. |
| 10,609,091 B2 | 3/2020 | Hong et al. |
| 10,659,252 B2 | 5/2020 | Boutros et al. |
| 10,693,782 B2 | 6/2020 | Jain et al. |
| 10,708,229 B2 | 7/2020 | Sevinc et al. |
| 10,728,174 B2 | 7/2020 | Boutros et al. |
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,805,181 B2 | 10/2020 | Boutros et al. |
| 10,805,192 B2 | 10/2020 | Boutros et al. |
| 10,812,378 B2 | 10/2020 | Nainar et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |

(56) References Cited

U.S. PATENT DOCUMENTS

| | | |
|---|---|---|
| 2006/0195896 A1 | 8/2006 | Fulp et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0214282 A1 | 9/2007 | Sen |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalai et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0021942 A1 | 1/2013 | Bacthu et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0100851 A1 | 4/2013 | Bacthu et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0291088 A1 | 10/2013 | Shieh et al. |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0343378 A1 | 12/2013 | Veteikis et al. |
| 2014/0003422 A1 | 1/2014 | Mogul et al. |
| 2014/0010085 A1 | 1/2014 | Kavunder et al. |
| 2014/0046997 A1 | 2/2014 | Dain et al. |
| 2014/0046998 A1 | 2/2014 | Dain et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092906 A1 | 4/2014 | Kandaswamy et al. |
| 2014/0092914 A1 | 4/2014 | Kondapalli |
| 2014/0096183 A1 | 4/2014 | Jain et al. |
| 2014/0101226 A1 | 4/2014 | Khandekar et al. |
| 2014/0101656 A1 | 4/2014 | Zhu et al. |
| 2014/0115578 A1 | 4/2014 | Cooper et al. |
| 2014/0129715 A1 | 5/2014 | Mortazavi |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0269717 A1 | 9/2014 | Thubert et al. |
| 2014/0269724 A1 | 9/2014 | Mehler et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |

(56) References Cited

U.S. PATENT DOCUMENTS

| | | |
|---|---|---|
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0321459 A1 | 10/2014 | Kumar et al. |
| 2014/0330983 A1 | 11/2014 | Zisapel et al. |
| 2014/0334485 A1 | 11/2014 | Jain et al. |
| 2014/0351452 A1 | 11/2014 | Bosch et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1 | 1/2015 | Zhang et al. |
| 2015/0023354 A1 | 1/2015 | Li et al. |
| 2015/0026345 A1 | 1/2015 | Ravinoothala et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071301 A1 | 3/2015 | Dalal |
| 2015/0078384 A1 | 3/2015 | Jackson et al. |
| 2015/0103645 A1 | 4/2015 | Shen et al. |
| 2015/0103679 A1 | 4/2015 | Tessmer et al. |
| 2015/0109901 A1 | 4/2015 | Tan et al. |
| 2015/0124608 A1 | 5/2015 | Agarwal et al. |
| 2015/0124622 A1 | 5/2015 | Kovvali et al. |
| 2015/0124840 A1 | 5/2015 | Bergeron |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0237013 A1 | 8/2015 | Bansal et al. |
| 2015/0242197 A1 | 8/2015 | Alfonso et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0365322 A1 | 12/2015 | Shatzkamer et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0381493 A1 | 12/2015 | Bansal et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0057687 A1 | 2/2016 | Horn et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0105333 A1 | 4/2016 | Lenglet et al. |
| 2016/0119226 A1 | 4/2016 | Guichard et al. |
| 2016/0134528 A1 | 5/2016 | Lin et al. |
| 2016/0149816 A1 | 5/2016 | Roach et al. |
| 2016/0164776 A1 | 6/2016 | Biancaniello |
| 2016/0164787 A1 | 6/2016 | Roach et al. |
| 2016/0164826 A1 | 6/2016 | Riedel et al. |
| 2016/0173373 A1 | 6/2016 | Guichard et al. |
| 2016/0182684 A1 | 6/2016 | Connor et al. |
| 2016/0197839 A1 | 7/2016 | Li et al. |
| 2016/0205015 A1 | 7/2016 | Halligan et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0337189 A1 | 11/2016 | Liebhart et al. |
| 2016/0337249 A1 | 11/2016 | Zhang et al. |
| 2016/0344565 A1 | 11/2016 | Batz et al. |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019329 A1 | 1/2017 | Kozat et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064749 A1 | 3/2017 | Jain et al. |
| 2017/0078176 A1 | 3/2017 | Lakshmikantha et al. |
| 2017/0126497 A1 | 5/2017 | Dubey et al. |
| 2017/0126522 A1 | 5/2017 | McCann et al. |
| 2017/0134538 A1 | 5/2017 | Mahkonen et al. |
| 2017/0142012 A1 | 5/2017 | Thakkar et al. |
| 2017/0149582 A1 | 5/2017 | Cohn et al. |
| 2017/0149675 A1 | 5/2017 | Yang |
| 2017/0163531 A1 | 6/2017 | Kumar et al. |
| 2017/0195255 A1 | 7/2017 | Pham et al. |
| 2017/0208011 A1 | 7/2017 | Bosch et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250902 A1 | 8/2017 | Rasanen et al. |
| 2017/0250917 A1 | 8/2017 | Ruckstuhl et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317926 A1 | 11/2017 | Penno et al. |
| 2017/0317954 A1 | 11/2017 | Masurekar et al. |
| 2017/0324651 A1 | 11/2017 | Penno et al. |
| 2017/0331672 A1 | 11/2017 | Fedyk et al. |
| 2017/0339110 A1 | 11/2017 | Ni |
| 2017/0346764 A1 | 11/2017 | Tan et al. |
| 2017/0364794 A1 | 12/2017 | Mahkonen et al. |
| 2017/0373990 A1 | 12/2017 | Jeuk et al. |
| 2018/0041524 A1 | 2/2018 | Reddy et al. |
| 2018/0063018 A1 | 3/2018 | Bosch et al. |
| 2018/0091420 A1 | 3/2018 | Drake et al. |
| 2018/0115471 A1 | 4/2018 | Curcio et al. |
| 2018/0124061 A1 | 5/2018 | Raman et al. |
| 2018/0139098 A1 | 5/2018 | Sunavala et al. |

(56) References Cited

U.S. PATENT DOCUMENTS

| | | |
|---|---|---|
| 2018/0145899 A1 | 5/2018 | Rao |
| 2018/0159733 A1 | 6/2018 | Poon et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0184281 A1 | 6/2018 | Tamagawa et al. |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0213040 A1 | 7/2018 | Pak et al. |
| 2018/0227216 A1 | 8/2018 | Hughes |
| 2018/0234360 A1 | 8/2018 | Narayana et al. |
| 2018/0248755 A1 | 8/2018 | Hecker et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0295053 A1 | 10/2018 | Leung et al. |
| 2018/0302242 A1 | 10/2018 | Hao et al. |
| 2018/0337849 A1 | 11/2018 | Sharma et al. |
| 2018/0349212 A1 | 12/2018 | Liu et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0132220 A1 | 5/2019 | Boutros et al. |
| 2019/0132221 A1 | 5/2019 | Boutros et al. |
| 2019/0140947 A1 | 5/2019 | Zhuang et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0229937 A1 | 7/2019 | Nagarajan et al. |
| 2019/0238363 A1 | 8/2019 | Boutros et al. |
| 2019/0238364 A1 | 8/2019 | Boutros et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0076684 A1 | 3/2020 | Naveen et al. |
| 2020/0076734 A1 | 3/2020 | Naveen et al. |
| 2020/0145331 A1 | 5/2020 | Bhandari et al. |
| 2020/0162318 A1 | 5/2020 | Patil et al. |
| 2020/0204492 A1 | 6/2020 | Sarva et al. |
| 2020/0213366 A1 | 7/2020 | Hong et al. |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274944 A1 | 8/2020 | Naveen et al. |
| 2020/0274945 A1 | 8/2020 | Rolando et al. |
| 2020/0322271 A1 | 10/2020 | Jain et al. |
| 2020/0358696 A1 | 11/2020 | Hu et al. |
| 2020/0366526 A1 | 11/2020 | Boutros et al. |

FOREIGN PATENT DOCUMENTS

| | | |
|---|---|---|
| CN | 101729412 A | 6/2010 |
| CN | 103516807 A | 1/2014 |
| CN | 103795805 A | 5/2014 |
| EP | 2426956 A1 | 3/2012 |
| JP | 2005311863 A | 11/2005 |
| WO | 9918534 A2 | 4/1999 |
| WO | 2008095010 A1 | 8/2008 |
| WO | 2014182529 A1 | 11/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |
| WO | 2020046686 A1 | 3/2020 |
| WO | 2020171937 A1 | 8/2020 |

OTHER PUBLICATIONS

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Author Unknown, "Datagram," Jun. 22, 2012, 2 pages, retrieved from https://web.archive.org/web/20120622031055/https://en.wikipedia.org/wiki/datagram.
Author Unknown, "AppLogic Features," Jul. 2007, 2 pages. 3TERA, Inc.
Author Unknown, "Enabling Service Chaining on Cisco Nexus 1000V Series," Month Unknown, 2012, 25 pages, CISCO.
Casado, Martin, et al., "Virtualizing the Network Forwarding Plane," Dec. 2010, 6 pages.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Greenberg, Albert, et al., "VL2: A Scalable and Flexible Data Center Network," SIGCOMM '09, Aug. 17-21, 2009, 12 pages, ACM, Barcelona, Spain.
Guichard, J., et al., "Network Service Chaining Problem Statement," Network Working Group, Jun. 13, 2013, 14 pages, Cisco Systems, Inc.
Halpern, J., et al., "Service Function Chaining (SFC) Architecture," draft-ietf-sfc-architecture-02, Sep. 20, 2014, 26 pages, IETF.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.
Kumar, S., et al., "Service Function Chaining Use Cases in Data Centers," draft-ietf-sfc-dc-use-cases-01, Jul. 21, 2014, 23 pages, IETF.
Liu, W., et al., "Service Function Chaining (SFC) Use Cases," draft-liu-sfc-use-cases-02, Feb. 13, 2014, 17 pages, IETF.
Non-Published Commonly Owned U.S. Appl. No. 16/444,826, filed Jun. 18, 2019, 125 pages, VMware, Inc.
Non-Published Commonly Owned U.S. Appl. No. 16/444,845, filed Jun. 18, 2019, 124 pages, VMware, Inc.
Non-Published Commonly Owned U.S. Appl. No. 16/444,884, filed Jun. 18, 2019, 98 pages, VMware, Inc.
Non-Published Commonly Owned U.S. Appl. No. 16/444,907, filed Jun. 18, 2019, 98 pages, VMware, Inc.
Non-Published Commonly Owned U.S. Appl. No. 16/444,927, filed Jun. 18, 2019, 99 pages, VMware, Inc.
Non-Published Commonly Owned U.S. Appl. No. 16/444,935, filed Jun. 18, 2019, 98 pages, VMware, Inc.

(56) References Cited

OTHER PUBLICATIONS

Non-Published Commonly Owned U.S. Appl. No. 16/444,956, filed Jun. 18, 2019, 98 pages, VMware, Inc.
Non-Published Commonly Owned U.S. Appl. No. 16/444,964, filed Jun. 18, 2019, 98 pages, VMware, Inc.
Non-Published Commonly Owned U.S. Appl. No. 16/444,978, filed Jun. 18, 2019, 98 pages, VMware, Inc.
Non-Published Commonly Owned U.S. Appl. No. 16/444,989, filed Jun. 18, 2019, 98 pages, VMware, Inc.
Non-Published Commonly Owned U.S. Appl. No. 16/445,004, filed Jun. 18, 2019, 98 pages, VMware, Inc.
Non-Published Commonly Owned U.S. Appl. No. 16/445,016, filed Jun. 18, 2019, 99 pages, VMware, Inc.
Non-Published Commonly Owned U.S. Appl. No. 16/445,023, filed Jun. 18, 2019, 99 pages, VMware, Inc.
Non-Published Commonly Owned U.S. Appl. No. 16/445,031, filed Jun. 18, 2019, 99 pages, VMware, Inc.
Non-Published Commonly Owned U.S. Appl. No. 16/445,035, filed Jun. 18, 2019, 98 pages, VMware, Inc.
Non-Published Commonly Owned U.S. Appl. No. 16/445,044, filed Jun. 18, 2019, 98 pages, VMware, Inc.
Non-Published Commonly Owned U.S. Appl. No. 16/445,051, filed Jun. 18, 2019, 99 pages, VMware, Inc.
Non-Published Commonly Owned U.S. Appl. No. 16/445,058, filed Jun. 18, 2019, 99 pages, VMware, Inc.
Non-Published Commonly Owned U.S. Appl. No. 16/445,062, filed Jun. 18, 2019, 98 pages, VMware, Inc.
Non-Published Commonly Owned U.S. Appl. No. 16/445,064, filed Jun. 18, 2019, 99 pages, VMware, Inc.
Non-Published Commonly Owned U.S. Appl. No. 16/668,477, filed Oct. 30, 2019, 31 pages, VMware, Inc.
Non-Published Commonly Owned U.S. Appl. No. 16/668,485, filed Oct. 30, 2019, 55 pages, VMware, Inc.
Non-Published Commonly Owned U.S. Appl. No. 16/668,505, filed Oct. 30, 2019, 39 pages, VMware, Inc.
Non-Published Commonly Owned U.S. Appl. No. 16/741,544, filed Jan. 13, 2020, 31 pages, VMware, Inc.
Non-Published Commonly Owned U.S. Appl. No. 16/785,674, filed Feb. 10, 2020, 29 pages, VMware, Inc.
Non-Published Commonly Owned U.S. Appl. No. 16/843,913, filed Apr. 9, 2020, 119 pages, VMware, Inc.
Non-Published Commonly Owned U.S. Appl. No. 16/843,919, filed Apr. 9, 2020, 123 pages, VMware, Inc.
Non-Published Commonly Owned U.S. Appl. No. 16/904,377, filed Jun. 17, 2020, 120 pages, VMware, Inc.
Non-Published Commonly Owned U.S. Appl. No. 16/904,390, filed Jun. 17, 2020, 121 pages, VMware, Inc.
Non-Published Commonly Owned U.S. Appl. No. 16/904,399, filed Jun. 17, 2020, 121 pages, VMware, Inc.
Non-Published Commonly Owned U.S. Appl. No. 16/904,430, filed Jun. 17, 2020, 120 pages, VMware, Inc.
Non-Published Commonly Owned U.S. Appl. No. 16/904,437, filed Jun. 17, 2020, 121 pages, VMware, Inc.
Non-Published Commonly Owned U.S. Appl. No. 16/904,442, filed Jun. 17, 2020, 121 pages, VMware, Inc.
Non-Published Commonly Owned U.S. Appl. No. 16/904,446, filed Jun. 17, 2020, 121 pages, VMware, Inc.
Non-Published Commonly Owned U.S. Appl. No. 16/905,909, filed Jun. 18, 2020, 36 pages, Nicira, Inc.
Non-Published Commonly Owned U.S. Appl. No. 16/945,675, filed Jul. 31, 2020, 51 pages, Nicira, Inc.
Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.
Non-Published Comonly Owned U.S. Appl. No. 17/067,635, filed Oct. 9, 2020, 65 pages, Nicira, Inc.
Siasi, N., et al., "Container-Based Service Function Chain Mapping," 2019 SoutheastCon, Apr. 11-14, 2019, 6 pages, IEEE, Huntsville, AL., USA.

DETECTING FAILURE OF LAYER 2 SERVICE USING BROADCAST MESSAGES

CLAIM OF BENEFIT TO PRIOR APPLICATIONS

This application is a continuation application of U.S. patent application Ser. No. 15/937,621, filed Mar. 27, 2018, now published as U.S. Patent Publication 2019/0306036. U.S. patent application Ser. No. 15/937,621, now published as U.S. Patent Publication 2019/0306036, is incorporated herein by reference.

BACKGROUND

In a software defined network, a set of gateway devices (e.g., Edge Nodes) connecting the internal virtualized network and an external network may have a layer 2 bump in the wire service (i.e., a service that does not change the layer 2 addresses of a processed data message) inserted in the processing pipeline. Failure of the layer 2 service is difficult to detect in some instances. When a backup layer 2 service node is provided and a primary layer 2 service node fails, the gateway device must begin sending the data messages to the backup layer 2 service node. A method for learning of the failure and quickly redirecting data messages to the backup layer 2 service node is necessary.

BRIEF SUMMARY

Some embodiments provide a method for providing a layer 2 (L2) bump-in-the-wire service at a gateway device (e.g., a layer 3 (L3) gateway device) at the edge of a logical network. The method, in some embodiments, establishes a connection from a first interface of the gateway device to a service node that provides the L2 service. The method also establishes a connection from a second interface of the gateway device to the L2 service node. The method then sends data messages received by the gateway device that require the L2 service to the service node using the first interface. In some embodiments, north-to-south traffic (i.e., from the external network to the logical network) is sent to the service node using the first interface while the south-to-north traffic is sent to the service node using the second interface.

Some embodiments provide a method for applying different policies at the service node for different tenants of a datacenter. Data messages received for a particular tenant that require the L2 service are encapsulated or marked as belonging to the tenant before being sent to the service node. Based on the encapsulation or marking, the service node provides the service according to policies defined for the tenant.

The first and second interfaces of the gateway devices have different internet protocol (IP) addresses and media access control (MAC) addresses in some embodiments. The IP addresses, in some embodiments, are not used to communicate with devices of external networks and can have internal IP addresses used within the logical network. The next hop MAC address for a data message requiring the L2 service sent from the first interface will be the MAC address of the second interface and will arrive at the second interface with the destination MAC address unchanged by the service node. In some embodiments, interfaces for connecting to the L2 service are disabled on standby gateway devices of the logical network and are enabled on only an active gateway device.

Connections to the service node, in some embodiments, are made through layer 2 switches. In some embodiments, each interface connects to a different switch connected to the service node. The service node, in some embodiments, is a cluster of service nodes in an active-standby configuration that each connect to the same pair of switches. In some embodiments of an active-standby configuration, an active service node provides the L2 service while the standby service nodes drop all data messages that they receive. Failover between the active and standby service nodes is handled by the L2 service nodes with no involvement of the L3 gateway device in some embodiments.

The gateway device, in some embodiments, sends heartbeat signals between the two interfaces connected to the L2 service nodes in order to detect failure of the L2 service (e.g., a failure of all the service nodes). In some embodiments, the heartbeat signals are unidirectional heartbeat signals (e.g., a unidirectional bidirectional-forwarding-detection (BFD) session) sent from each interface to the other. The heartbeat signals, in some embodiments, use the IP address of the destination interface as the destination IP address, but use a broadcast MAC address in order to reach the current active L2 service node in the case of a failover (i.e., an active service node failing and a standby service node becoming the new active service node).

Additional embodiments utilize the unidirectional broadcast heartbeat signals to decrease the time between a failover and data messages being forwarded to the new active service node as well as detect a failure of the service node cluster. In embodiments with an L2 bump-in-the-wire service between any two interfaces (e.g., between interfaces of two devices, or between two interfaces of a same device) an architecture using different L2 switches between each interface and the service node cluster is used in conjunction with the unidirectional broadcast heartbeat signals to reduce the time to redirect data messages to the new active service node.

In some embodiments, the switches connecting the interfaces to the service node cluster associate MAC addresses with particular ports of the switch based on incoming data messages. For example, a data message received at the switch on a first port with a source MAC address "MAC1" (e.g., a 48-bit MAC address of the first interface) will cause the switch to associate the first port with the MAC address MAC1 and future data messages with destination address MAC1 will be sent out of the switch from the first port. By sending the heartbeat data messages to the other interface with shorter time intervals between heartbeats than a timeout of a MAC address association (i.e., the time interval before an association between a MAC address and a port is removed) the ports of the switches attached to the active service node can be associated with the correct MAC addresses for the two interfaces more quickly. As a standby node becomes an active node, the broadcast heartbeat data messages will be received and processed by the newly-active service node and the switches will associate the ports connected to the newly-active service node with the appropriate MAC addresses of the two interfaces.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method for providing a layer 2 (L2) bump-in-the-wire service at a gateway device (e.g., a layer 3 (L3) gateway device) at the edge of a logical network. The method, in some embodiments, establishes a connection from a first interface of the gateway device to a service node that provides the L2 service. The method also establishes a connection from a second interface of the gateway device to the L2 service node. The method then sends data messages received by the gateway device that require the L2 service to the service node using the first interface. In some embodiments, north-to-south traffic (i.e., from the external network to the logical network) is sent to the service node using the first interface while the south-to-north traffic is sent to the service node using the second interface.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples below refer to data packets, packets, data messages, or messages, it should be understood that the invention should not be limited to any specific format or type of data message. Also, as used in this document, references to L2, L3, L4, and L7 layers (or layer 2, layer 3, layer 4, layer 7) are references to the second data link layer, the third network layer, the fourth transport layer, and the seventh application layer of the OSI (Open System Interconnection) layer model, respectively.

Figure 1:
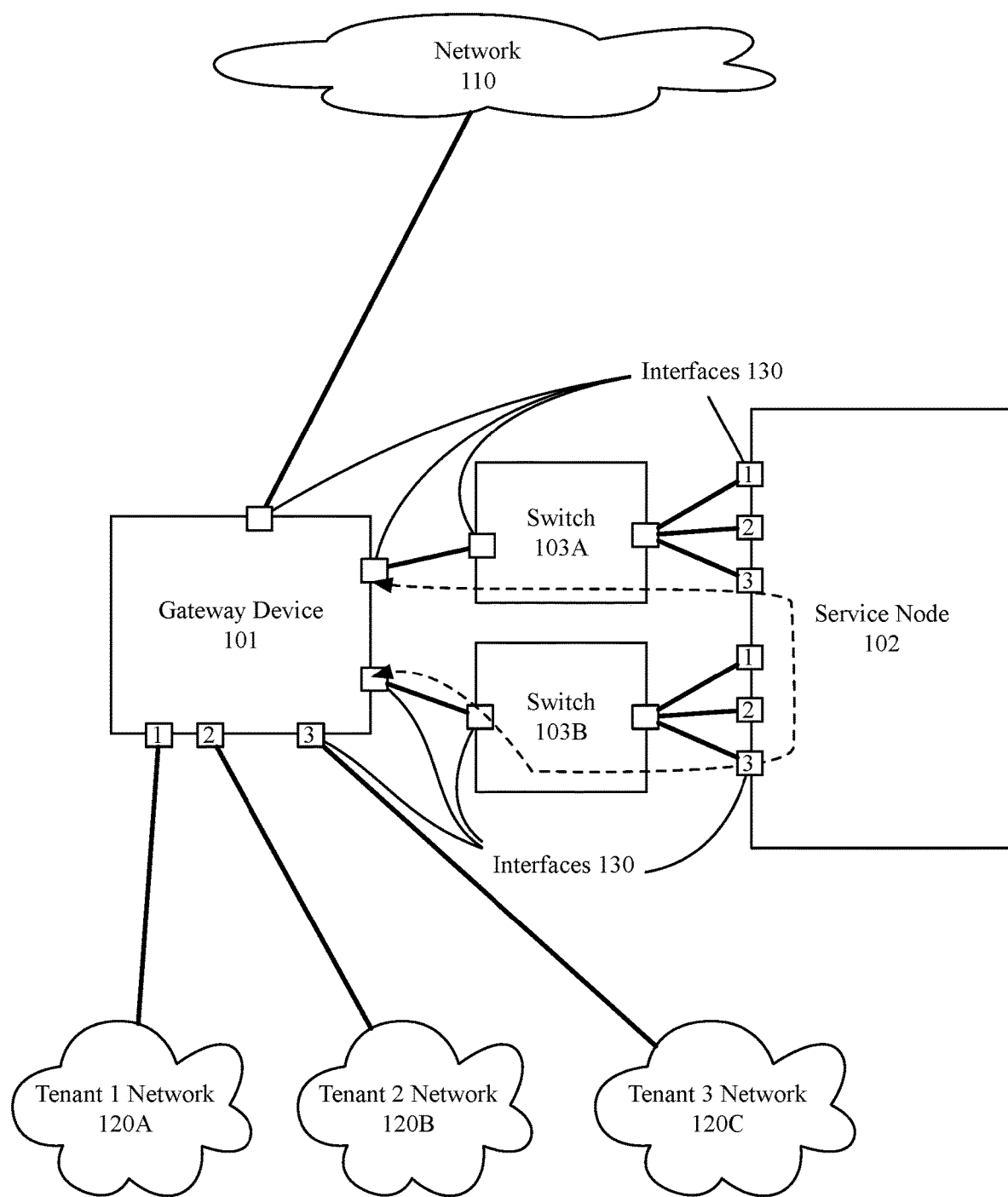
FIG. 1 conceptually illustrates a system in which some on the embodiments of the invention are performed.

FIG. 1 conceptually illustrates a system in which some on the embodiments of the invention are performed. FIG. 1 depicts a gateway device 101 that serves as the gateway between a network 110 (e.g., an untrusted network) and a set of tenant networks 120 (e.g., a set of trusted networks that are logical networks in some embodiments). In some embodiments, the gateway device implements a tier 0 (T0) logical router that is shared by multiple tenant networks, each of which connect to the T0 logical router through a unique interface (e.g. logical interface) using a tenant (or tier 1 (T1)) logical router. The gateway device 101 also includes a set of interfaces 130 used to connect to a service node 102 that provides a layer 2 (L2) bump-in-the-wire service (e.g., a firewall, load balancing, network address translation (NAT), or virtual private network (VPN) service) through switches 103.

In some embodiments, gateway device 101 allows for per-tenant policies to be applied by the service node 102 by appending a context (e.g., encapsulation or other marking) to a data message sent to service node 102 with a tenant identifier (e.g., a virtual local area network (VLAN) tag that is associated with a particular tenant's policies). In FIG. 1, service node 102 is shown with a set of three logical interfaces, labeled 1-3 (corresponding to tenants 1-3), each connected to one interface of the two switches 103 (e.g., using VLAN trunking). The logical interfaces, in some embodiments, correspond to a single physical interface of the service node 102. Service node 102, in some embodiments, represents a cluster of service nodes that provide the L2 service. In some embodiments utilizing a cluster of service nodes, the service nodes are configured in an active-standby configuration with one service node performing the L2 service with the additional service nodes in the cluster acting as standby service nodes in case the active service node fails.

FIG. 1 also depicts a datapath for data messages requiring the L2 service (depicted as the dotted line between two interfaces of gateway device 101). The datapath ignores the datapath outside of the gateway device, as the data message may be received from, and destined for, any of the networks 110 or 120A-C. Gateway device 101 is depicted as a gateway device, but one of ordinary skill in the art would understand that the device, in some embodiments, is at a different point in the network that requires an L2 bump-in-the-wire service.

Gateway device 101, in some embodiments, is a host computing machine that executes an edge node program. In some embodiments, the edge node program includes at least one managed forwarding element (e.g. a managed routing element, managed switching element, or both), that implements a set of logical forwarding elements of a set of logical networks for a set of tenants. Further details relating to implementing logical networks using gateway devices (e.g., edge nodes) are found in U.S. Pat. No. 9,787,605 which is hereby incorporated by reference. Further details of the elements of FIG. 1 are described below in the discussion of FIG. 2.

Figure 2:
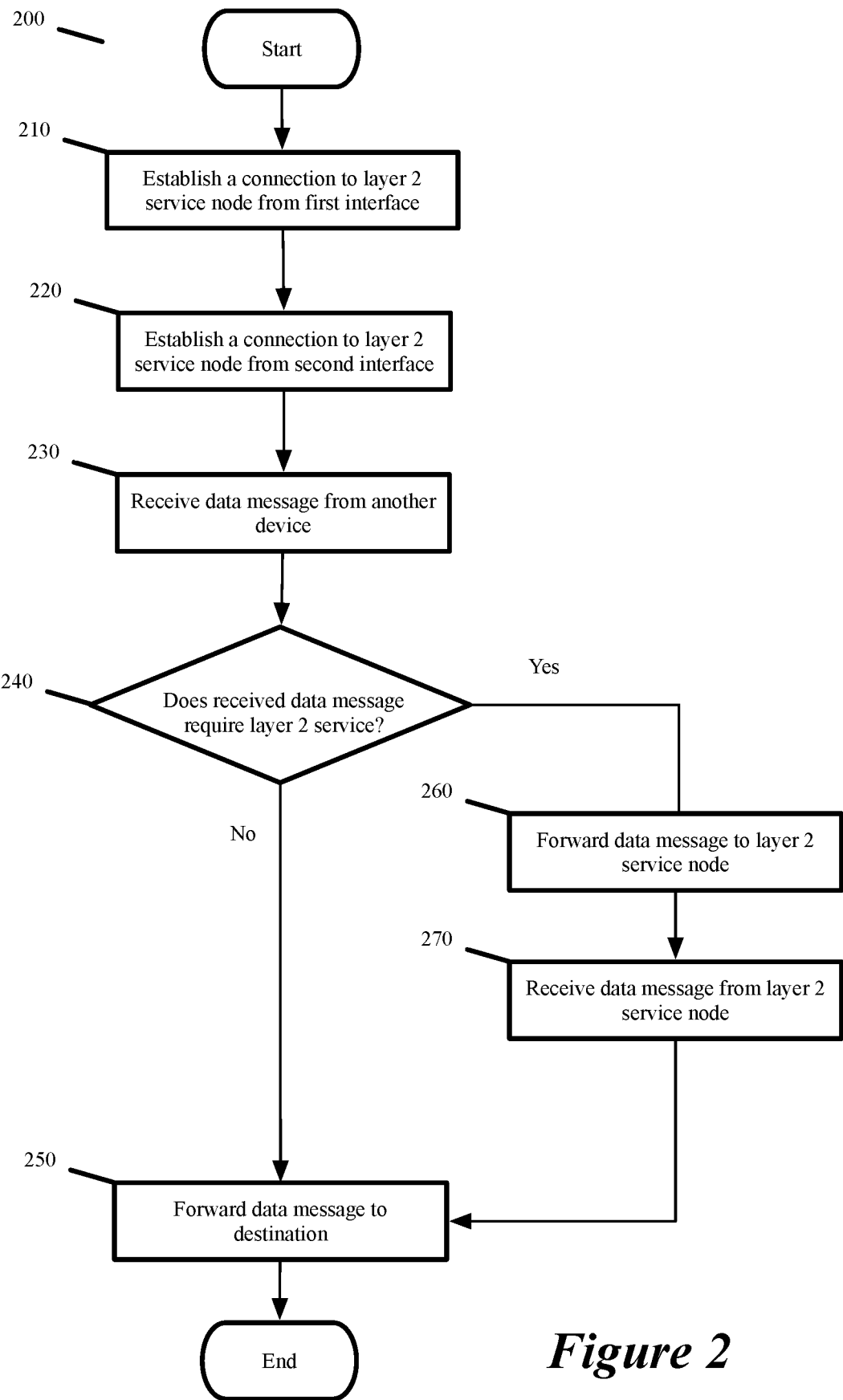
FIG. 2 conceptually illustrates a process to establish two connections from a device to a layer 2 bump-in-the-wire service node for the service node to provide a service to data messages.

FIG. 2 conceptually illustrates a process 200 to establish two connections from a device (e.g., gateway device 101) to a layer 2 (L2) bump-in-the-wire service node for the service node to provide a service to data messages. In some embodiments, process 200 is performed by the device (e.g., gateway device 101). Process 200 begins by establishing (at 210) a connection to the L2 service node from a first interface 130 of the device. The first interface has a first internet protocol (IP) address which, in some embodiments, is a private IP address that is not used by external networks. In some embodiments, the connection from the first interface is made through a first layer 2 switch (e.g., switch 103A). A layer 2 switch, in some embodiments, learns associations between ports (e.g., interface 130) of the switch and media access control (MAC) addresses of the devices connected to each port from a source MAC address field in the header of the data messages received at the port. In some embodiments, the first switch is a logical switch that is implemented by a physical switch (e.g. a virtual switch or a hardware switch).

The process continues by establishing (at 220) a second connection to the L2 service node from a second interface of the device. The second interface has a second, internet protocol (IP) address different from the first interface which, in some embodiments, is a private IP address that is not used by external networks. In some embodiments, the connection from the second interface is made through a second layer 2 switch. The second layer 2 switch also learns MAC address/port pairings from received data messages in some embodiments. The second switch, in some embodiments, is a logical switch that is implemented by any of a virtual switch or a hardware switch.

Once connections are established from the device, the process receives (at 230) a data message from another device (e.g., a physical router, or a T1 logical router for a specific tenant). The data message, in some embodiments, is a data message exchanged between an external network and a tenant logical network for which the device serves as a gateway device. In some embodiments, the data message is a data message exchanged between an external network and a device in a datacenter for which the device acts as a gateway device. The data message, in some embodiments, is directed from a device in a tenant logical network to another device in a same datacenter or network for which the device acts as a gateway device (e.g., in a same tenant's logical network or a different tenant's logical network). The datacenter, in some embodiments, implements a set of logical networks for a set of tenants. In some embodiments, the data message is received on a third interface of the device. The third interface, in some embodiments, has an IP address that is advertised to external networks by the device.

After receiving the data message, the process determines (at 240) whether the data message requires the L2 bump-in-the-wire service. In some embodiments, the determination is based on a value in a set of header fields of the received data message. The value that the determination is based on may be any combination of a source or destination IP or MAC address, a protocol, and a port number. In some embodiments, a set of header fields are associated specifically with the L2 service (e.g., a network address translation (NAT) service or load balancing (LB) service may be addressable by a particular set of IP addresses, or may be associated with an IP subnet for which they provide the service). The determination, in some embodiments, is made using a routing entry (e.g., a policy-based routing entry) that indicates a certain IP address or range of IP addresses should be forwarded to the MAC of the second interface from the first interface. The range of IP addresses, in some embodiments, is associated with a network for which the L2 service is required. In some embodiments, the policy-based routing entry identifies values in a combination of fields used to determine that a received data message should be forwarded to the MAC of the second interface from the first interface. The fields that may be used to specify data messages that should be forwarded to the MAC of the second interface from the first interface, in some embodiments, include a source IP address, destination IP address, source MAC address, destination MAC address, source port, destination port, and protocol.

The determination (at 240) whether the data message requires the L2 bump-in-the-wire service, in some embodiments, also takes into account the logical network from which the data message was received. In some embodiments, each tenant logical network implements a tier 1 logical router that connects to a tier 0 logical router executing on a gateway device through a different logical interface. For data messages received on a particular logical interface, some embodiments, apply logical-interface-specific (e.g., tenant-specific) policies to determine (at 240) whether the data message requires the service. The tenant, in some embodiments, defines at least two "zones" that include different devices or interfaces and requires sets of services (e.g., services provided by a service node) for data messages between each pair of zones.

If the process determines (at 240) that the data message does not require the L2 service, the process (at 250) processes the data message and forwards it towards its destination and the process ends. In some embodiments, the data message processing is logical processing performed by a software forwarding element implementing a logical forwarding element or elements (e.g., a logical router, a logical switch, or both).

If the process determines (at 240) that the data message does require the L2 service, the process forwards (at 260) the data message out one of the interfaces connected to the L2 service node to be received at the other interface connected to the L2 service node. In some embodiments, north-south traffic coming from an external network into a logical network for which the device is a gateway device is sent to the service node from the first interface to be received at the second interface while south-north traffic from a logical network to the external network is sent to the service node from the second interface to be received by the first interface.

In some embodiments, forwarding (at 260) the data message includes an encapsulation or other marking operation to identify a particular tenant. For example, referring to FIG. 1, a data message received from logical interface '1' of gateway device 101 that requires the service provided by service node 102, is encapsulated so that it will be received at logical interface '1' of service node 102. Based on the encapsulation, service node 102 applies policies specific to tenant 1. Data messages sent between interfaces use the MAC addresses associated with the destination interface of the device which remains unchanged by the processing performed by the L2 service node.

After forwarding (at 260) the data message out of one interface connected to the L2 service node, the process receives (at 270) the data message at the other interface. In some embodiments, the received data message includes an encapsulation or marking associated with a specific tenant. The process then processes (at 250) the received data message and forwards the data message towards its destination. In some embodiments, multiple L2 bump-in-the-wire services are independently provided in a similar fashion.

Figure 3:
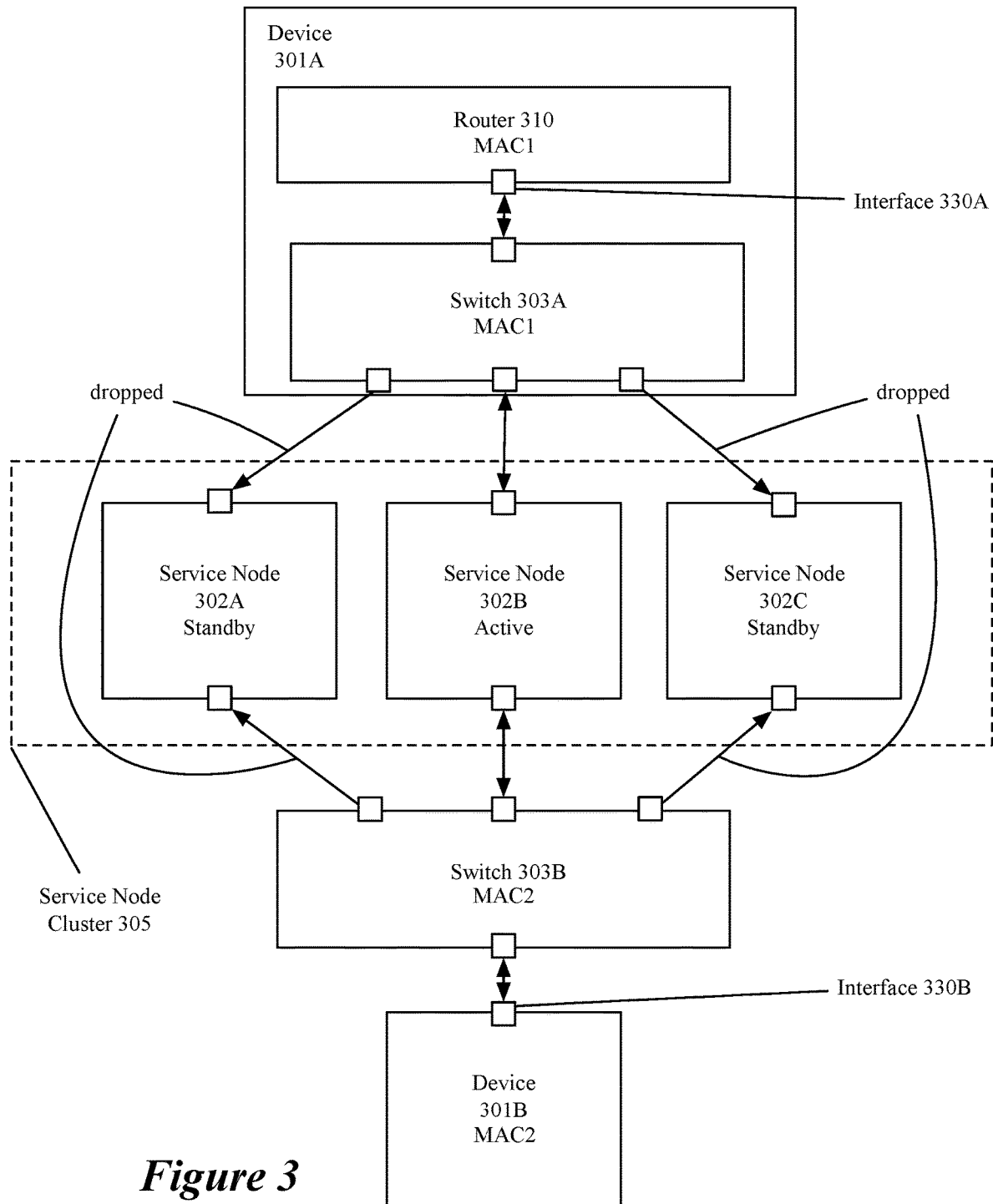
FIG. 3 conceptually illustrates an embodiment in which an L2 service is provided between two devices by a cluster of service nodes.

FIG. 3 conceptually illustrates an embodiment in which an L2 service is provided between two devices 301 by a service node in a cluster of service nodes 305. Device 301A is depicted as including router 310 and switch 303A which, in some embodiments, are software executing on device 301A. Router 310 and switch 303A, in some embodiments, implement logical forwarding elements. In some embodiments, device 301A is a gateway device connecting an internal network to an external network. The internal network is a physical network implementing a logical network in some embodiments, with device 301A implementing the logical forwarding elements using router 310 and switch 303A.

Connections to the service nodes 302, in the depicted embodiment, are made through layer 2 switches 303. The different devices 301 connect to the cluster of service nodes 302 through different switches 303. The service nodes 302 are depicted as a cluster of service nodes 305 in an active-standby configuration that each connect to the same pair of switches. In some embodiments of an active-standby configuration, an active service node provides the L2 service while the standby service nodes drop all data messages that they receive. Failover between the active and standby service nodes is handled by the L2 service nodes with no involvement of devices 301 in some embodiments.

Devices 301, in some embodiments, send heartbeat signals between the two interfaces connected to the L2 service nodes in order to detect failure of the L2 service (e.g., a failure of all the service nodes). In some embodiments, the heartbeat signals are unidirectional heartbeat signals (e.g., a unidirectional bidirectional-forwarding-detection (BFD) session) sent from each interface to the other. The heartbeat signals, in some embodiments, use the IP address of the destination interface as the destination IP address, but use a broadcast MAC address in order to reach the current active L2 service node in the case of a failover (i.e., an active service node failing and a standby service node becoming the new active service node).

Figure 4:
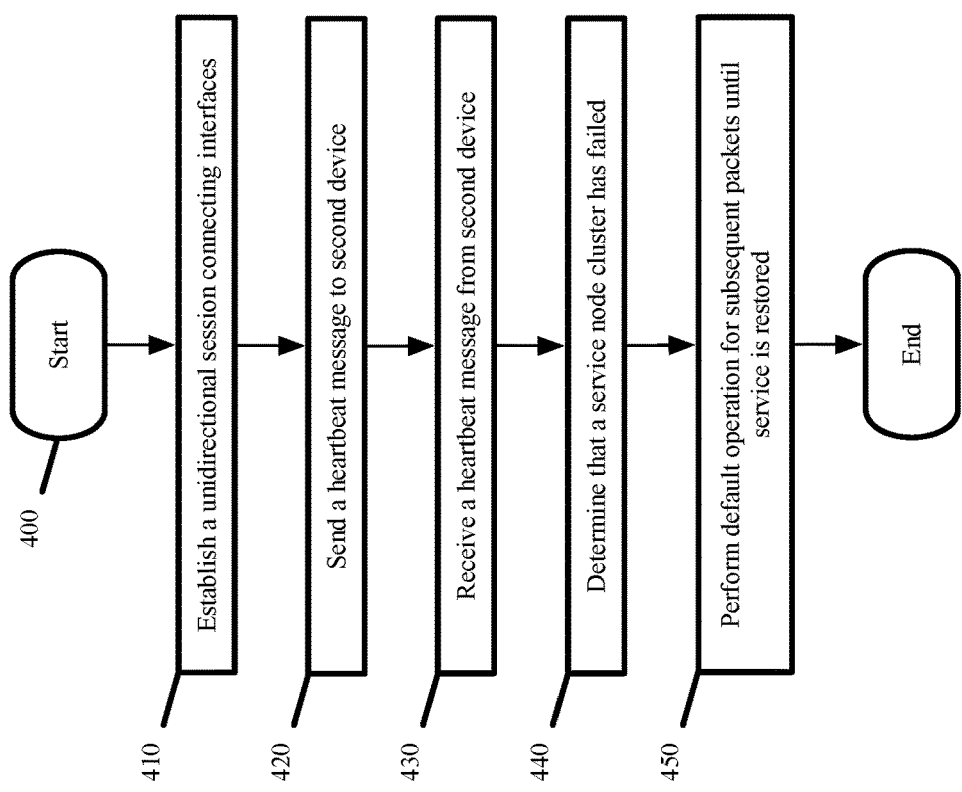
FIG. 4 conceptually illustrates a process for detecting failure using the heartbeat signals.

FIG. 4 conceptually illustrates a process 400 for detecting failure using the heartbeat signals. Process 400, in some embodiments, is executed by at least one device 301 and, in some embodiments, is executed by each device 301. Process 400 begins (at 410) by establishing a unidirectional session between the interface (e.g., 330A) that connects to the cluster of service nodes and the interface (e.g. 330B) of the device attached to the other switch connected to the cluster of service nodes.

The process subsequently sends (at 420) a heartbeat data message to the second device. In some embodiments, device 301A directs the data message to the IP address of the interface of the second device (e.g., 330B) using a broadcast MAC address. The heartbeat data message has a source MAC address of the interface of the first device that is learned by the switches connected to the service nodes and associated by the switches with the interfaces on which the heartbeat data message is received by the switch.

The process receives (at 430) a heartbeat data message from the second device. In some embodiments, the heartbeat messages are sent and received at intervals that are shorter than a timeout of a learned MAC address/interface pairing in the switches (e.g., 303). In some embodiments, the received message is sent from the second device directed to the IP address of the first interface using a broadcast MAC address.

At 440, the process determines that the service nodes (e.g., 302) have failed. In some embodiments, the determination is made based on a time elapsed since a last heartbeat message was received. The time elapsed to determine failure of the service nodes (e.g., 302), in some embodiments, is based on the time between heartbeat signals, e.g., 5 heartbeat signals, or on a failover time for the service nodes in a service node cluster.

Upon determining (at 440) that a service node cluster has failed, the process performs (at 450) a default operation for subsequent packets until the service is restored. In some embodiments, the default operation is forwarding all data messages to their destination without sending them to be provided the L2 service. In other embodiments, the default operation is dropping all data messages that require the L2 service until the L2 service is restored. In some embodiments, the device continues to send heartbeat data messages and determines that the service has been restored when a heartbeat is received from the other device or interface.

Figure 5:
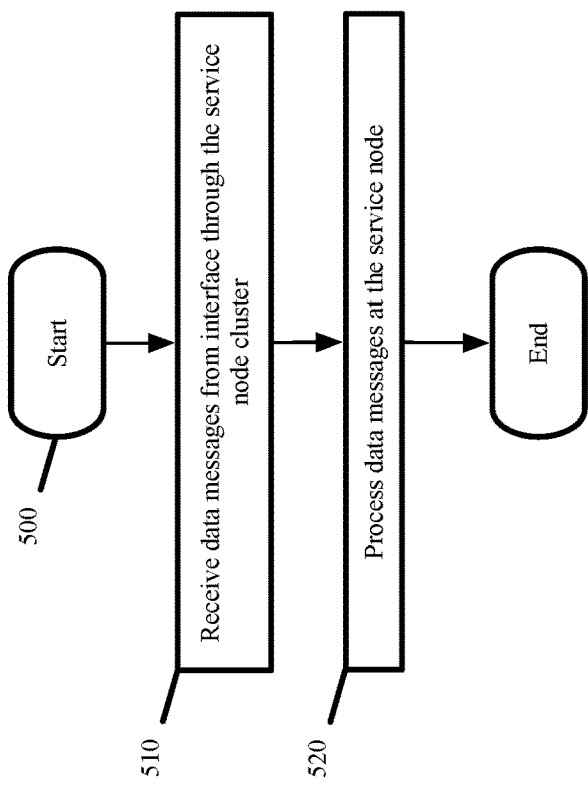
FIG. 5 conceptually illustrates a process performed by a service node in some embodiments.
Figure 6:
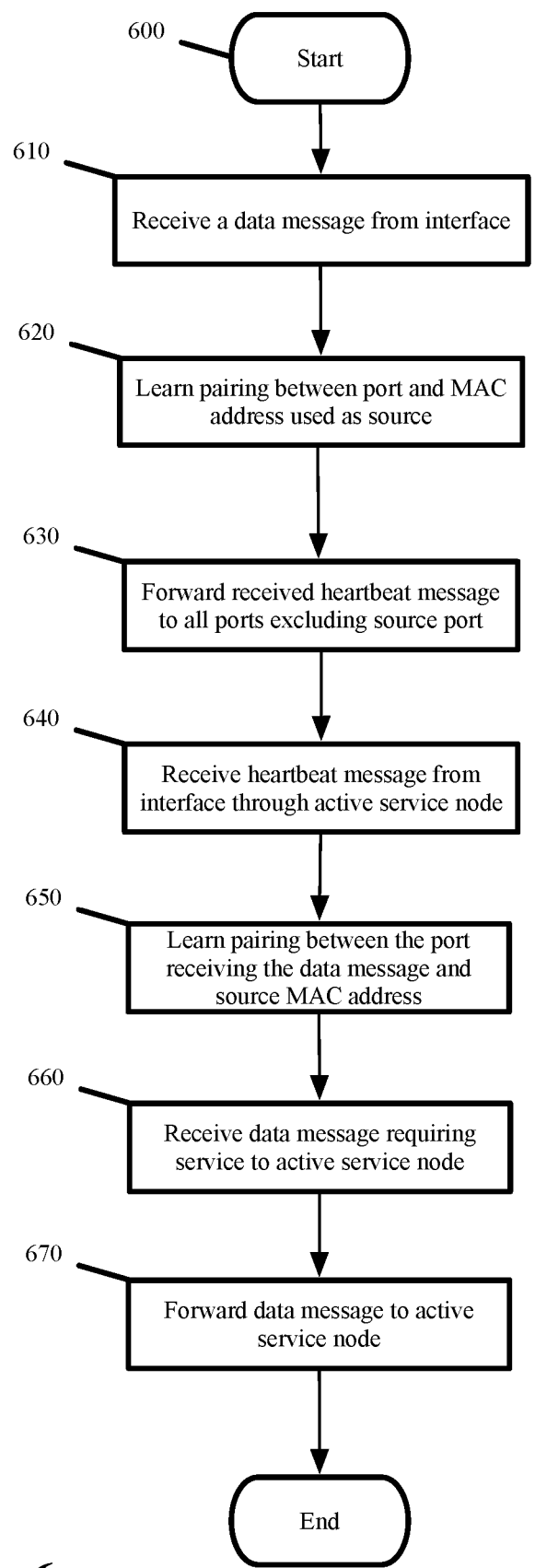
FIG. 6 conceptually illustrates a process performed by the switches, in some embodiments, to facilitate failover without the device, or devices, that send data messages to the service node cluster being aware of a service node cluster failover operation.

Additional embodiments utilize the unidirectional broadcast heartbeat signals to decrease the time between a failover and data messages being forwarded to the new active service node as well as detect a failure of the service node cluster. In embodiments with an L2 bump-in-the-wire service between any two interfaces (e.g., between interfaces of two devices, or between two interfaces of a same device) an architecture using different L2 switches between each interface and the service node cluster is used in conjunction with the unidirectional broadcast heartbeat signals to reduce the time to redirect data messages to the new active service node. FIGS. 5 and 6 conceptually illustrate processes performed by a service node and a switch, respectively, in some such embodiments.

FIG. 5 conceptually illustrates a process 500 performed by a service node in some embodiments. Process 500 begins by receiving (at 510) data messages sent from one of two interfaces in communication with each other through the service node cluster including the service node performing 500. When the service node is a standby service node, the data messages are heartbeat data messages that are addressed to an IP address associated with either one of the two interfaces of the device or devices in communication with the service node and a broadcast MAC address. In some embodiments, the heartbeat data messages are received from one of two interfaces connected to the service node cluster through a pair of switches as in FIG. 3. When the service node is an active service node, the data messages include data messages requiring the service provided by the service node cluster. In some embodiments, a data message is received with a context (e.g., an encapsulation or other marking) that is understood by the service node to identify a particular set of policies to apply to the data message. The context, in some embodiments, identifies a set of policies that are for a specific tenant.

The process then processes (at 520) the data messages at the service node. When the service node is designated as a standby service node, processing a data message, in some embodiments, comprises dropping the data message. Dropping data messages at the standby service node avoids redundant processing and, in embodiments providing a stateful service, misprocessing based on a lack of current state information. When the service node is designated, or acting, as an active service node, processing a heartbeat data message includes forwarding the data message to the destination interface without alteration.

Processing the data message at an active node, in some embodiments, includes applying tenant-specific policies to the data message. The tenant-specific policies are identified based on a context appended to the data message by the device (e.g., a gateway device) that directs the data message to the service node. Processing a data message requiring the service at an active service node includes providing the service and forwarding the data message to the destination IP address without altering the source and destination MAC addresses of the received data message.

A service node performing process 500, in some embodiments, acts as a standby service node at some times and, if an active service node fails, acts (or is designated) as the active service node at other times. The failover process between service nodes, in some embodiments, is independent of the devices sending the heartbeat data messages. In some embodiments, the service node cluster has a control or management computer or cluster that determines and designates the active service node. The control/management computer, in some embodiments, maintains its own failure detection protocol (e.g., BFD) to detect the health of the service nodes in a service node cluster and initiate a failover process.

FIG. 6 conceptually illustrates a process 600 performed by the switches, in some embodiments, to facilitate failover without the device, or devices, that send data messages to the service node cluster being aware of a service node cluster failover operation. The process begins by receiving (at 610) a data message from one of the interfaces of a device sending data messages to the service node cluster through the switch. The data message, in some embodiments, is a heartbeat data message sent from one interface to another through the switches and service node cluster. In some embodiments, the heartbeat data message uses a broadcast MAC address (i.e., FF:FF:FF:FF:FF:FF) as a destination MAC address. The heartbeat data message also includes a MAC address of the interface from which the data message was sent as a source MAC address.

The process then learns (at 620) a pairing between a port (e.g. interface) at which the data message was received and a MAC address used as a source MAC address of the received data message. The learning, in some embodiments, is accomplished through a table or other data structure that stores associations between MAC addresses and ports of the switch. The learned association is used to process subsequent data messages addressed to the MAC address by forwarding the subsequent data message to the destination from the associated port.

The process then forwards (at 630) the received heartbeat data message out all the ports other than the port on which it was received. The broadcast heartbeat data message is then received at the service nodes of the service node cluster as described in relation to operation 510 of FIG. 5 for a particular service node. As described above in relation to FIG. 5, only the active service node forwards the received heartbeat data message to the second interface through the second switch. The second switch receives the forwarded data message and associates the port connected to the active service node with the source MAC address of the heartbeat data message (i.e., the MAC address of the first interface) and forwards the heartbeat data message out all ports except for the port at which it was received as will be described in relation to operations 640 and 650 for the first switch performing process 600.

The process then receives (at 640) a heartbeat data message from the second interface through an active service node. The heartbeat data message is received from the active service node, but not the standby service nodes as only the active service node allows data messages to be forwarded towards the destination. The heartbeat data message, in some embodiments, is received by the first switch after a second switch receives the data message from the second interface. In some embodiments, the second interface sends the heartbeat data message using the second interface's MAC address as a source MAC address and a broadcast MAC address as the destination address. Based on the broadcast MAC address, the second switch floods the data message to all the service nodes as described for the first switch in operation 630.

The process then learns (at 650) a pairing between a port at which the data message was received and a MAC address used as a source MAC address of the received data message (i.e., the MAC address of the second interface). The port that is associated with the second interface's MAC address is the port connected to the active service node, because only the active service node forwards the data message to the first switch. The learned address/port pairing is stored, in some embodiments, in the same table or other data structure that stores the association between the MAC address of the first interface and the port at which the first heartbeat data message was received. The learned association is used to process subsequent data messages addressed to the MAC address of the second interface by forwarding the subsequent data message to the destination from the associated port. The switch has now learned the ports associated with the MAC addresses of the first and second interfaces and can use those learned associations to process subsequent data messages.

The process receives (at 660) a data message that requires the service provided by the service node cluster. The data message is received at the port of the switch that connects to the first interface, in some embodiments. The data message, in some embodiments, has a destination address that is the MAC address of the second interface.

The process then forwards (at 670) the data message that requires the service to the active service node. The process does not need to perform an address resolution protocol (ARP) operation to identify the port because the MAC address/port pairing was previously learned as part of learning operation 650. Additionally, if an active service node fails, the heartbeat data messages sent subsequent to the service node failover process will be forwarded by the new active service node and the MAC address/port pairings for the first and second interface MAC addresses will be remapped to the ports connected to the new active service node. One of ordinary skill in the art will understand that operations relating to heartbeat data messages are independent of operations related to data message processing for data messages received from a network connected to the device and may be omitted in some embodiments.

Figure 7A:
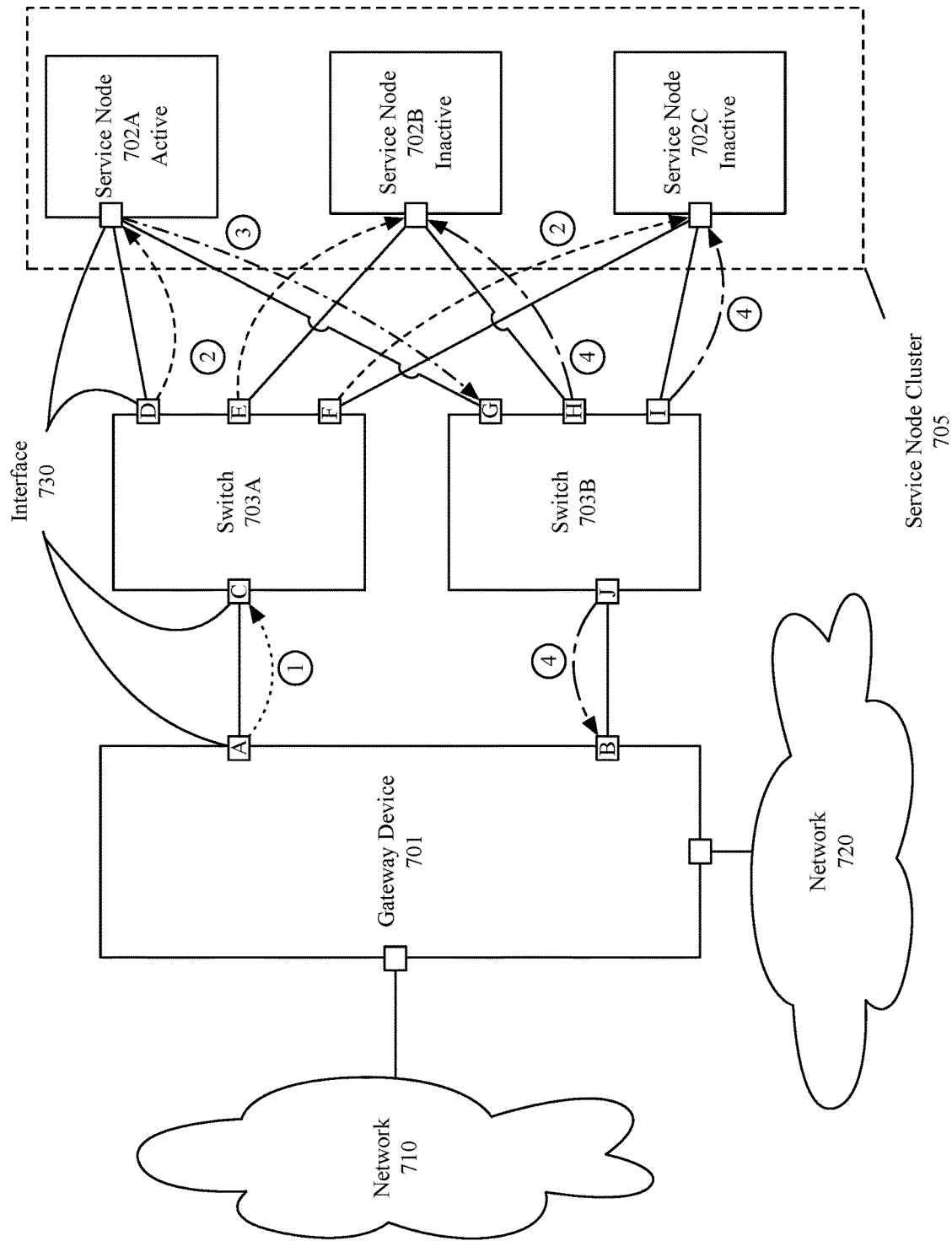
FIGS. 7A-B conceptually illustrate the flow of data messages in a single device embodiment for learning MAC addresses.
Figure 7B:
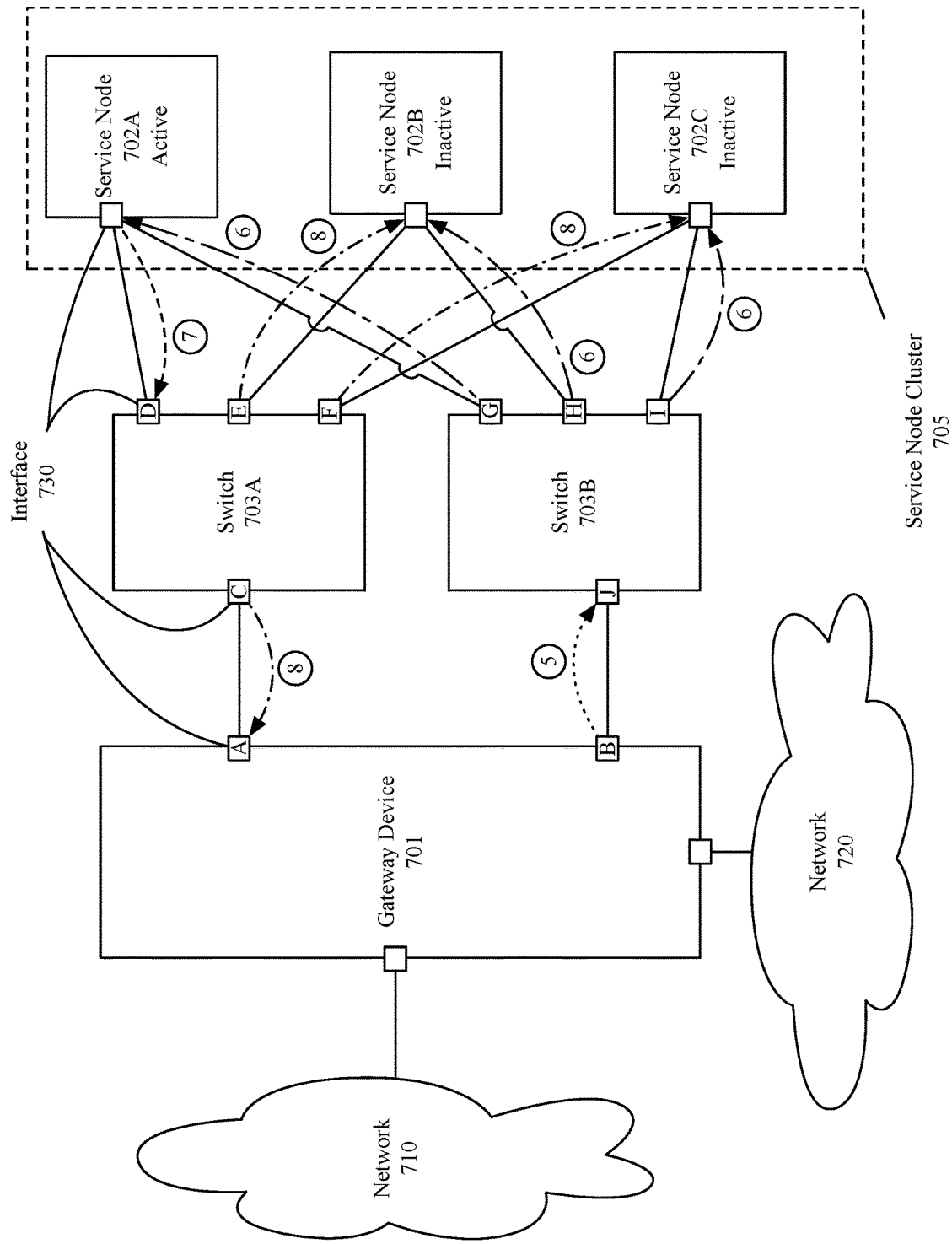

FIGS. 7A-B conceptually illustrates the flow of data messages in a single device embodiment 700 for learning MAC addresses. As for device 101 in FIG. 1, Device 701 serves as a gateway device between networks 710 and 720. Data message '1' represents a heartbeat data message sent from an interface 730A to an interface 730C (e.g., a port) of a switch 703A. Data message '1' is a heartbeat data message that has (1) a source IP address (Src IP) that is the IP address of interface 730A, (2) a source MAC address (Src MAC) that is the MAC address of interface 730A (e.g., MAC 1), (3) a destination IP address (Dst IP) that is the IP address of interface 730B, and (4) a destination MAC address that is a broadcast MAC address (e.g., FF:FF:FF:FF:FF:FF). As described above, switch 703A receives data message '1' at interface 730C and learns an association between MAC 1 and interface 730C, and forwards the data message as data messages '2' to all other interfaces 730D-F of the switch. Data message '2' is received by service nodes 702A-C and is forwarded to interface 730G of switch 703B only by the active service node 702A as data message '3' because standby service nodes 702B-C drop data messages received based on their designation as standby service nodes. Data messages '2' and '3' maintain the same source and destination addresses as data message '1' in some embodiments.

Switch 703B learns an association between MAC 1 and interface 730G as discussed above in relation to FIG. 6. Data message '3' is then forwarded to all other interfaces of switch 703B (i.e., interfaces 730H-J) as data message '4.' Device 701 receives the heartbeat data message and determines that the service cluster has not failed. Standby service nodes 702B-C drop the data message. At this stage, an association between the MAC address of interface 730A and interfaces 730C and 730G is learned by switches 703A and 703B respectively.

A similar heartbeat data message sent from the interface 730B causes an association between a MAC address of interface 730B (e.g., MAC 2) with interfaces 730J and 730C to be learned by switches 703B and 703A respectively. Data message '5' represents a heartbeat data message sent from an interface 730B to an interface 730J (e.g., a port) of a switch 703B. Data message '5' is a heartbeat data message that has (1) a Src IP that is the IP address of interface 730B, (2) a Src MAC that is the MAC address of interface 730B (e.g., MAC 2), (3) a Dst IP that is the IP address of interface 730A, and (4) a destination MAC address that is a broadcast MAC address (e.g., FF:FF:FF:FF:FF:FF). As described above, switch 703B receives data message '5' at interface 730J and learns an association between MAC 2 and interface 730J and forwards the data message as data messages '6' to all other interfaces 730G-I of the switch. Data message '6' is received by service nodes 702A-C and is forwarded to interface 730D of switch 703A only by the active service node 702A as data message '7' because standby service nodes 702B-C drop data messages received based on their designation as standby service nodes. Data messages '6' and '7' maintain the same source and destination addresses as data message '5' in some embodiments.

Switch 703A learns an association between MAC 2 and interface 730D as discussed above in relation to FIG. 6. Data message '7' is then forwarded to all other interfaces of switch 703A (i.e., interfaces 730C, E, and F) as data message '8.' Device 701 receives the heartbeat data message and determines that the service cluster has not failed. Standby service nodes 702B-C drop the data message. At this stage, an association between the MAC address of interface 730B and interfaces 730D and 730J is learned by switches 703A and 703B respectively.

Figure 8:
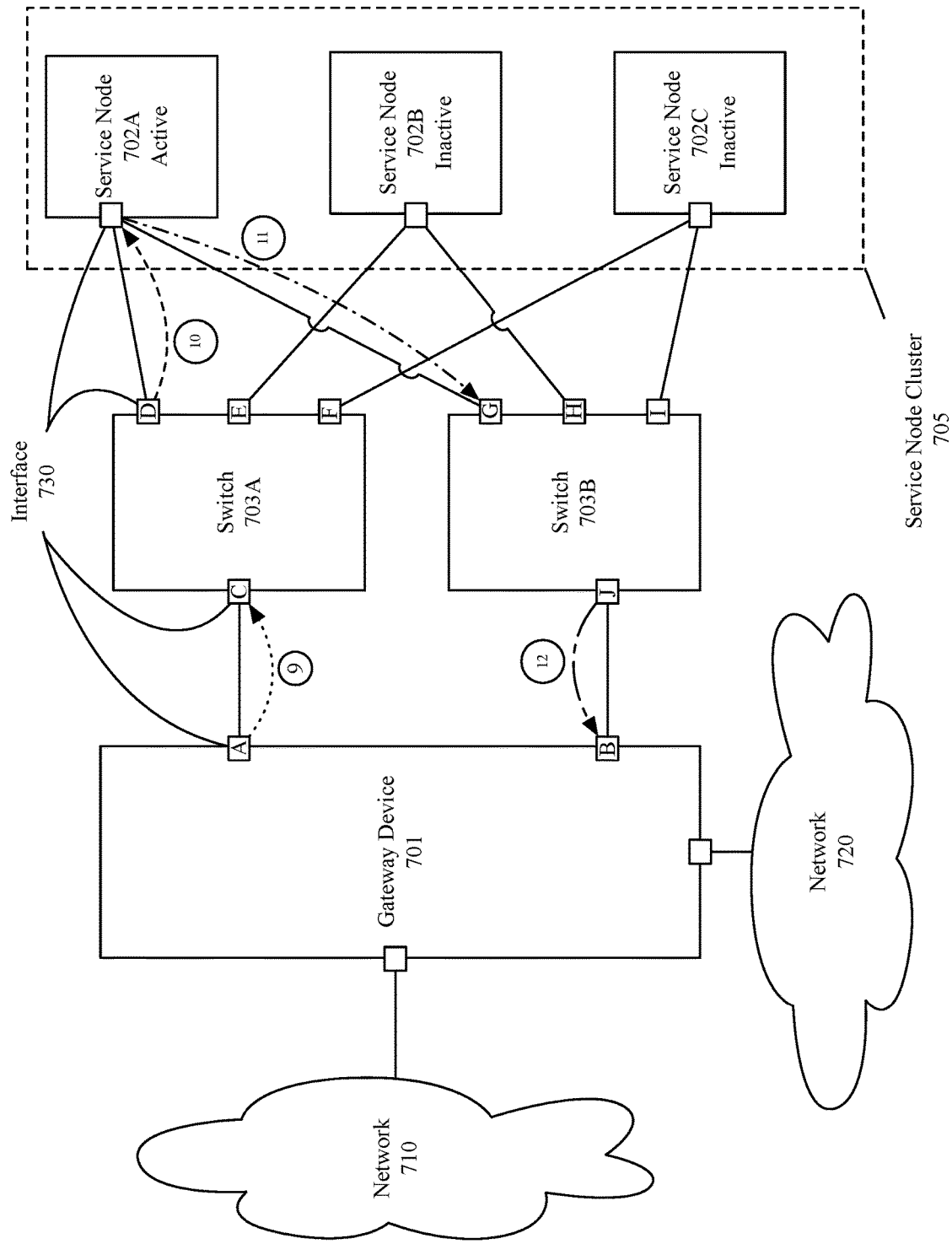
FIG. 8 conceptually illustrates the processing of a data message requiring a service provided by the service node cluster after the switches have learned MAC address/interface associations from the data messages depicted in FIGS. 7A-B or in other ways, such as by using an address resolution protocol (ARP) operation.

FIG. 8 conceptually illustrates the processing of a data message requiring a service provided by the service node cluster 705 after the switches have learned MAC address/interface associations from the data messages depicted in FIG. 7 or in other ways, such as by using an address resolution protocol (ARP) operation. Data message '9' represents a data message requiring the service provided by service node cluster 705. Data message '9' has (1) a Src IP that is the IP address of interface 730A, (2) a Src MAC that is the MAC address of interface 730A (e.g., MAC 1), (3) a Dst IP that is the IP address of interface 730B, and (4) a destination MAC address that is a MAC address of interface 730B (e.g., MAC 2). Data message '9' is sent from interface 730A to interface 730C of switch 703A.

Upon receiving the data message, switch 703A consults the table or other data structure storing the MAC/interface associations to determine that MAC 2 (i.e., the destination MAC address) is associated with interface 730D and sends, as data message '10,' the data message to service node 702A using interface 730D. Service node 702A processes the data message, including providing the service provided by the service node cluster 705 and sends the processed data message as data message '11' to interface 730G of switch 703B. Upon receiving data message '11,' switch 703B consults the table or other data structure storing the MAC/interface associations to determine that MAC 2 (i.e., the destination MAC address) is associated with interface 730J and sends, as data message '12,' the data message to interface 730B using interface 730J. Return data messages are handled similarly.

Figure 9A:
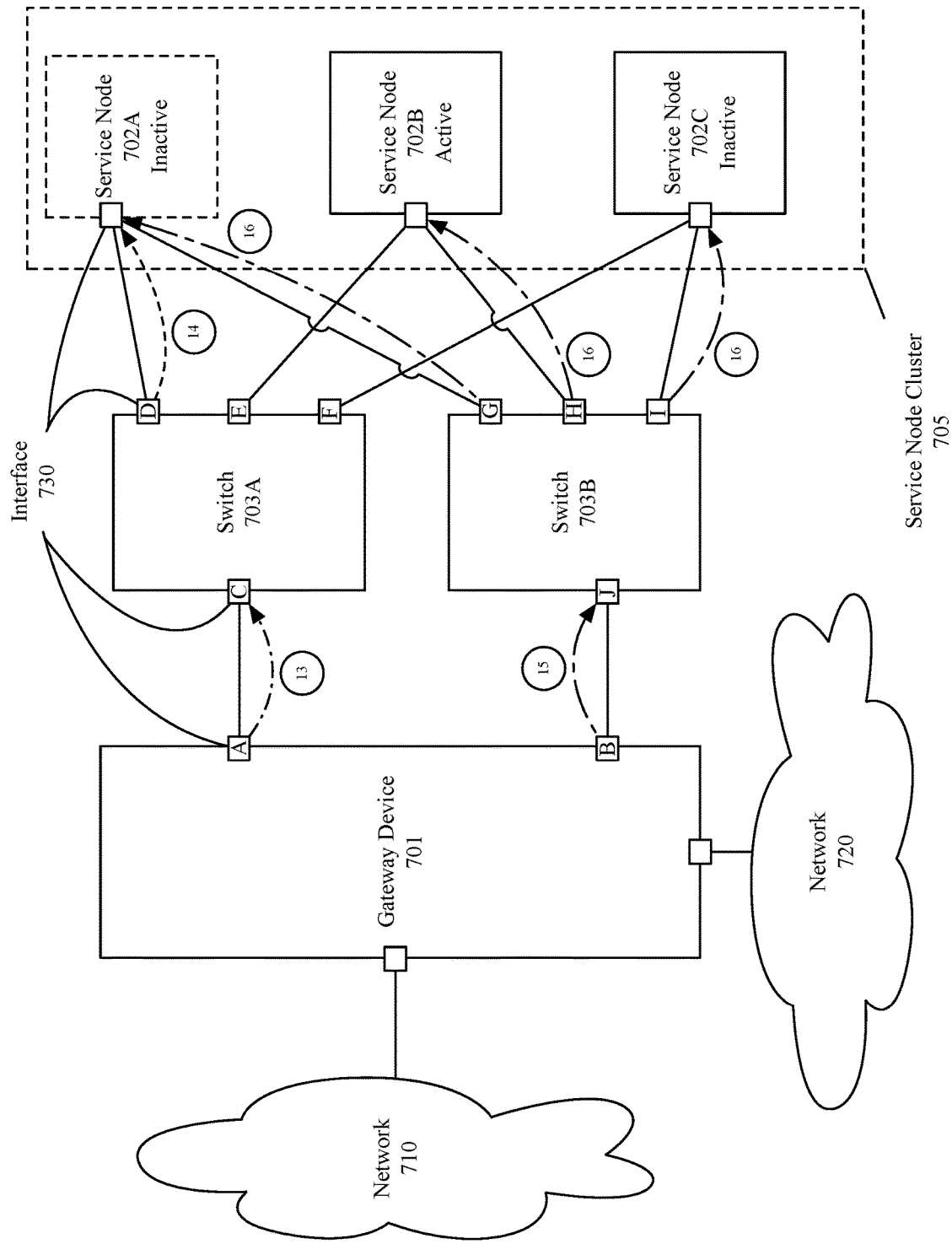
FIGS. 9A-B conceptually illustrate the path of a data message after a failover, before and after a subsequent heartbeat message is sent from an interface of a device.
Figure 9B:
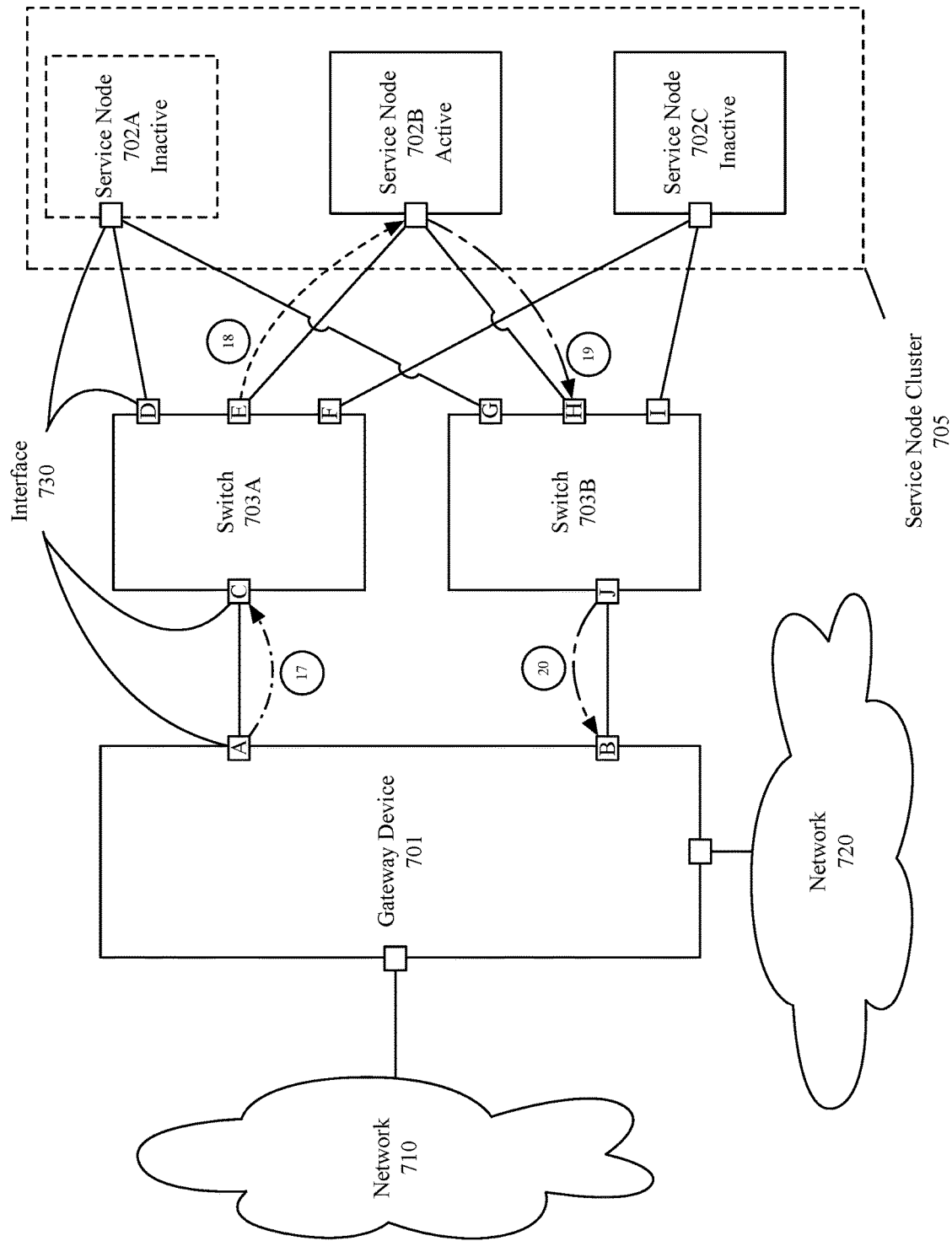

FIGS. 9A-B conceptually illustrate the path of a data message after a failover, before and after a subsequent heartbeat message is sent from an interface 730 of device 701. FIG. 9A illustrates the failure of service node 702A and service node 702B being designated as the new active service node. After the failure of service node 702A, data message '13' is sent from interface 730A with the same Src IP, Src MAC, Dst IP, and Dst MAC as data message '9.' Switch 703A sends data message '14' to service node 702A based on the association previously learned between MAC 2 and interface 730D, however, service node 702A has failed and the data message is lost. In a setup without the heartbeat data messages described in FIGS. 7A-B, the data messages in both directions would continue to be dropped (i.e., black-holed) until a timeout of the learned MAC address/interface associations, at which point a new learning operation (e.g. an ARP operation) would be performed indicating that the MAC address should be associated with the interface connected to the new active service node.

If, however, heartbeat data message '15' is sent from interface 730B (using the same combination of Src IP, Src MAC, Dst IP, and Dst MAC as data message '5'), switch 703B once again floods the data message as data messages '16' as described in relation to data message '6' and the new active service node 702B receives and forwards the data message to switch 703A (not depicted). This causes switch 703A to update its MAC address/interface table or other data structure to indicate an association between MAC 2 and interface 730E connected to service node 702B. Using this updated association allows subsequently received data message requiring the service provided by service node cluster 705 to follow a path illustrated by data messages '17'-'20' without any change in the set of Src IP, Src MAC, Dst IP, and Dst MAC at the device 701 for data messages going in the same direction. Heartbeat data messages are sent at time intervals that are shorter than a timeout interval for learned MAC address/interface associations so that in the case of service node failover, the service is restored based on the shorter heartbeat data message interval rather than the longer timeout interval for learned MAC address/interface associations.

Figure 10A:
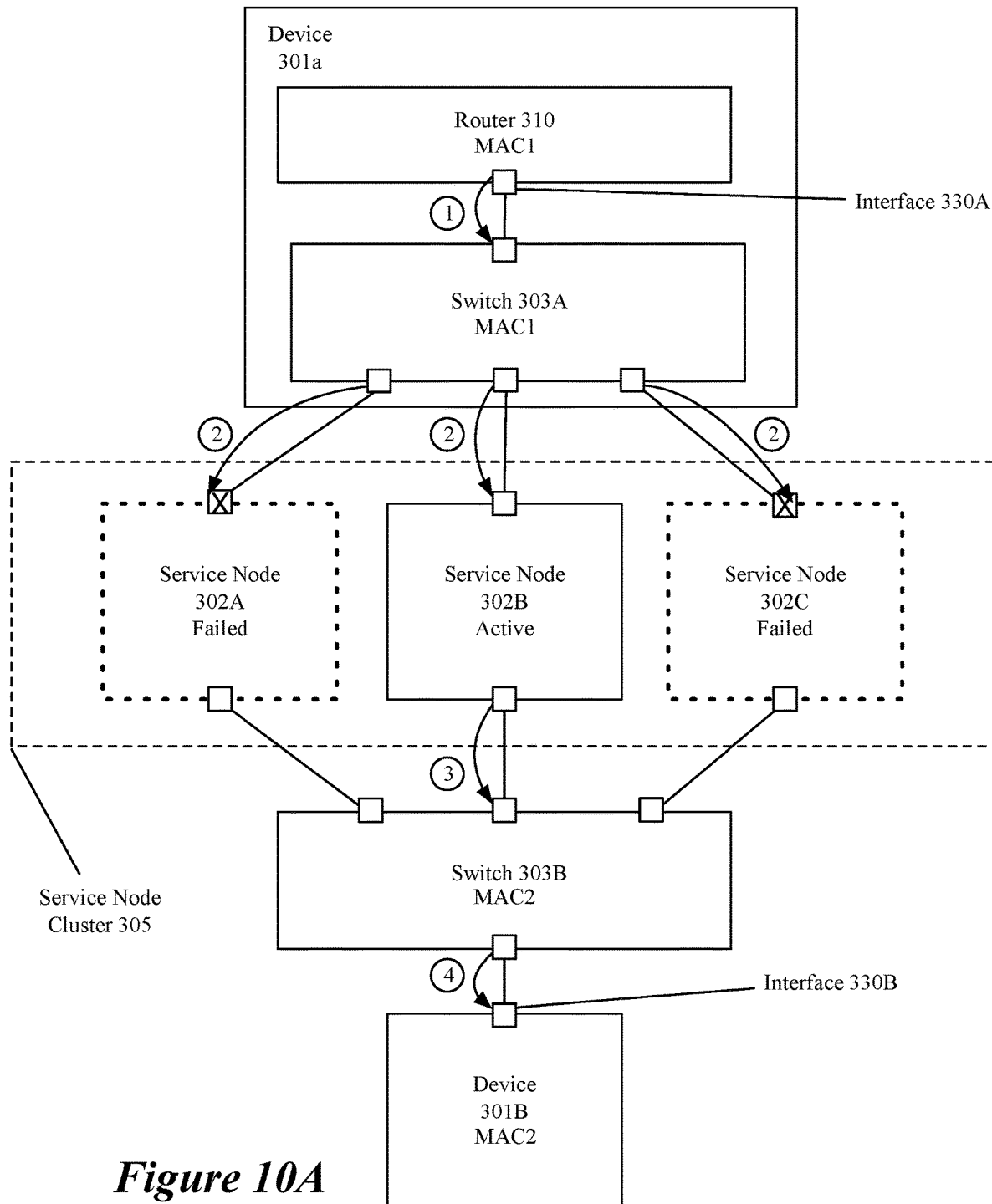
FIGS. 10A-B conceptually illustrate an embodiment in which the heartbeat data messages are used to detect failure of a service node cluster as discussed in relation to FIG. 4.
Figure 10B:
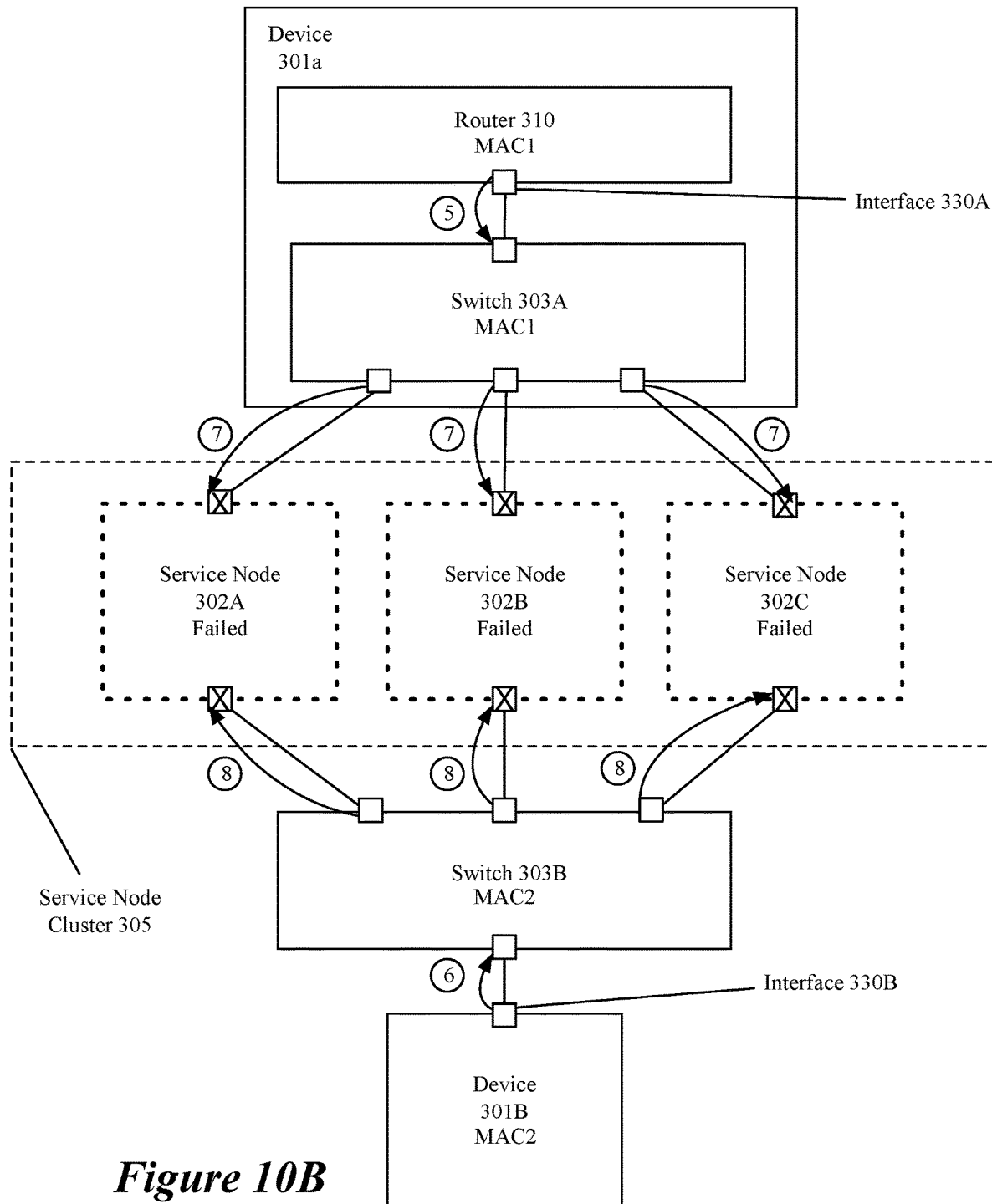

FIGS. 10A-B conceptually illustrates an embodiment in which the heartbeat data messages are used to detect failure of a service node cluster as discussed in relation to FIG. 4. FIG. 10A illustrates the same elements as in FIG. 3, however in FIG. 10A two of the three service nodes 302 have failed (i.e., 302A and 302C). A first heartbeat data message, data message '1,' is sent from interface 330A to interface 330B. Data message '1' traverses switch 303A, service node 302B and switch 303B before arriving at interface 330B. a heartbeat data message, data message '2,' is sent from interface 330B to interface 330A traversing switch 303B, service node 302B and switch 303A before being received by device 301A at interface 330A. As described in relation to FIG. 7, data messages '3' and '4' represent the rest of the datapath for heartbeat data messages. These heartbeat data messages are used to determine that the service node cluster 305 is still functioning (e.g., still providing the service).

FIG. 10B illustrates a heartbeat data message being unable to reach a destination interface after the failure of all the service nodes 302 in service node cluster 305. Data messages '5' and '6' represent heartbeat data messages that are sent by interface 330A and 330B respectively. Data messages '5' and '6' arrive at switches 303A and 303B respectively, are forwarded to all the service nodes 302A-C, as data messages '7' and '8' respectively, based on the broadcast destination MAC address, but are not forwarded towards the other interface because the service nodes have failed. In some embodiments, the failure of the service nodes is based on a connection failure between the switches and the service node or between the interface of the devices 301 and a switch 303. One of ordinary skill in the art would understand that the same service node cluster failure detection would function in the same way between two interfaces of a single device. In embodiments in which the two interfaces belong to a same device, failure detection may also be based on the fact that data messages the device sends out one interface are not received at the other interface which may enable faster failure detection than a system that is not aware of when heartbeat data messages are sent by the other device.

As discussed above in relation to FIG. 4, after a certain time interval (e.g., representing a certain number of missed heartbeat data messages) during which a heartbeat data message has not been received, devices 301 determine that the service node cluster 305 has failed and perform a default operation for data messages requiring the service provided by the service node cluster 305. In some embodiments, the default operation is to forward the data messages without providing the service (e.g., a fail-open condition) while in other embodiments, the default operation is to drop the data messages requiring the service (e.g., a fail-closed condition) until the service is restored. A fail-open condition may be more appropriate for services such as load balancing where security is not an issue while fail-closed may be more appropriate for a firewall operation relating to security and a network address translation (NAT) service which generally requires state information that is maintained by the service node providing the service.

Figure 11:
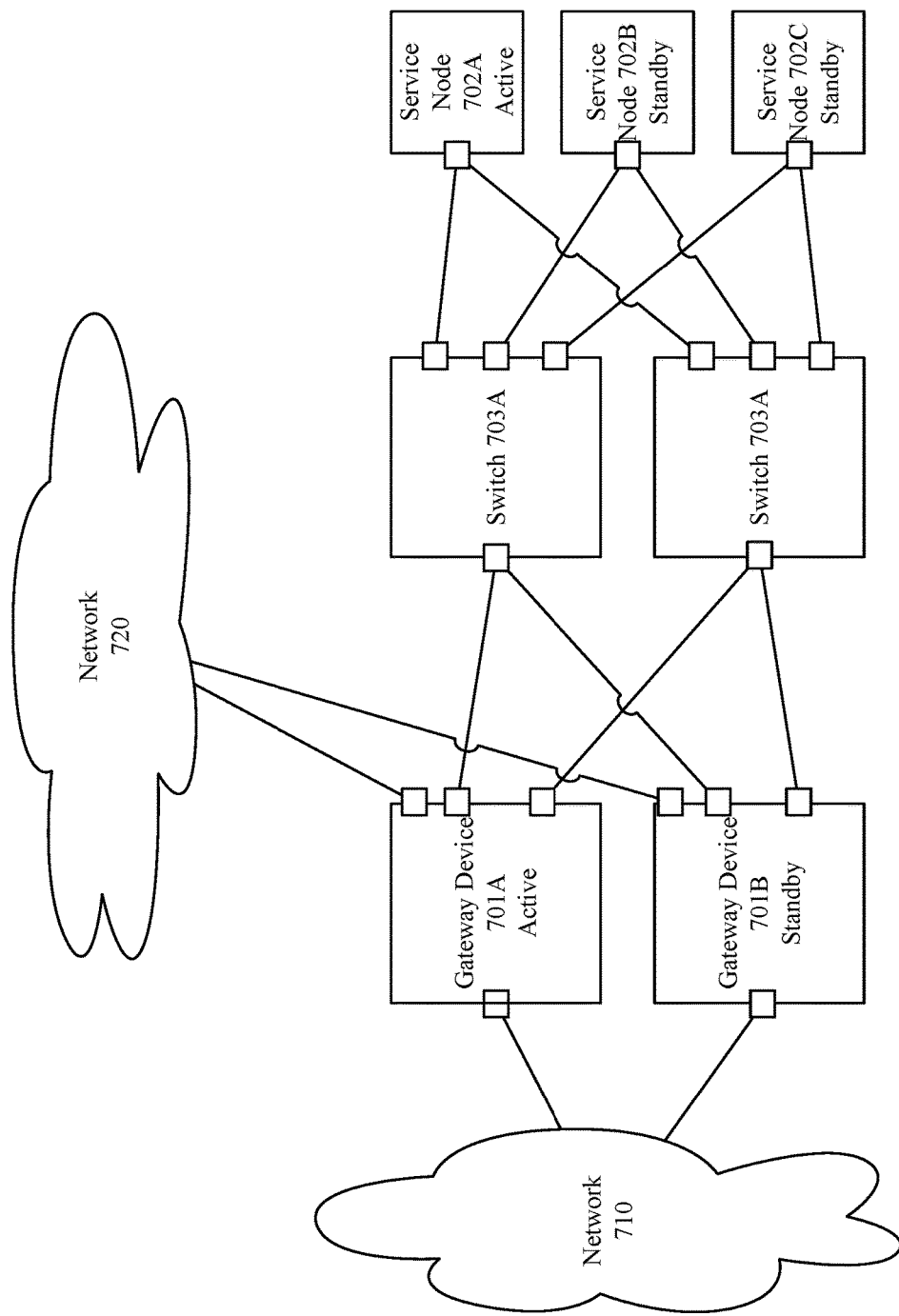
FIG. 11 illustrates an embodiment including gateway devices in an active-standby configuration at a border between two networks.

FIG. 11 illustrates an embodiment including gateway device 701A and gateway device 701B that each act at a border between network 710 (e.g., an external network) and network 720 (e.g., an internal/logical network). The elements of FIG. 11 act as the similarly numbered elements of FIG. 7 with the additional designation of one of the devices 701 as the active gateway device (e.g., gateway device 701A). The active gateway device 701A, in some embodiments receives all data messages exchanged between the networks 710 and 720. In some embodiments, the gateway devices also execute centralized aspects of a logical router for a logical network implemented in network 720. In some embodiments using a centralized logical router in the gateway devices, only one gateway device provides the centralized logical router services.

Figure 12:
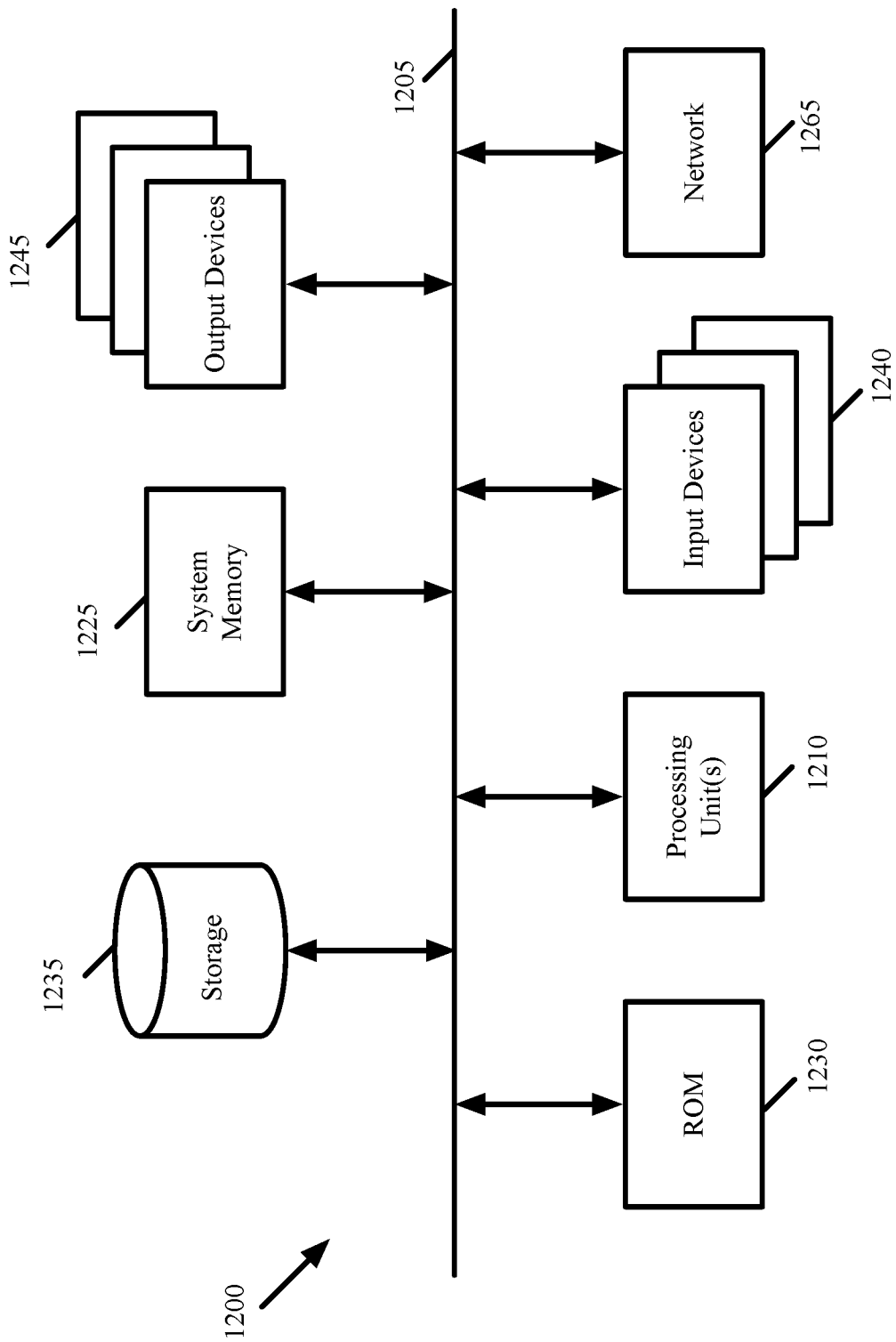
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory (ROM) 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2 and 4-6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for a device comprising:
   receiving a data message that requires a particular service provided by a service node, the particular service not changing layer 2 (L2) addresses associated with the data message;
   sending the data message to the service node from a first interface of the device connected to the service node to a second interface of the device that is also connected to the service node wherein the first interface has a media access control (MAC) address that is different from the MAC address of the second interface, said sending comprising using the MAC address of the second interface to send the data message to the service node; and
   receiving the data message from the service node at the second interface after the particular service has been performed on the data message by the service node.

2. The method of claim 1, wherein the first interface has an internet protocol (IP) address that is different from the IP address of the second interface.

3. The method of claim 1, wherein the using comprises using the MAC address of the second interface as a destination MAC address of the data message.

4. The method of claim 1, wherein a first connection to the service node is made through a switch.

5. The method of claim 4, wherein the switch is a first switch, and a second connection to the service node is made through a second switch.

6. The method of claim 1, wherein the service node is a first service node that is one of a plurality of service nodes configured as a cluster of service nodes to provide the particular service.

7. The method of claim 6, wherein the cluster of service nodes is configured in an active-standby configuration in which the first service node is an active service node.

8. The method of claim 7, wherein standby service nodes drop received data messages.

9. The method of claim 1, wherein the service node comprises one of a virtual machine, an appliance, a data compute node, a container, and a server.

10. A non-transitory machine readable medium storing a program for execution by a set of processing units, the program comprising sets of instructions for:

receiving a data message that requires a particular service provided by a service node, the particular service not changing layer 2 (L2) addresses associated with the data message;

sending the data message to the service node from a first interface of the device connected to the service node to a second interface of the device that is also connected to the service node, wherein the first interface has a media access control (MAC) address that is different from the MAC address of the second interface, the set of instructions for the sending comprising a set of instructions for using the MAC address of the second interface to send the data message to the service node; and receiving the data message from the service node at the second interface after the particular service has been performed on the data message by the service node.

11. The non-transitory machine readable medium of claim 10, wherein the first interface has an internet protocol (IP) address that is different from the IP address of the second interface.

12. The non-transitory machine readable medium of claim 10, wherein the set of instructions for using comprises a set of instructions of using the MAC address of the second interface as a destination MAC address of the data message.

13. The non-transitory machine readable medium of claim 10, wherein a first connection to the service node is made through a switch.

14. The non-transitory machine readable medium of claim 13, wherein the switch is a first switch, and a second connection to the service node is made through a second switch.

15. The non-transitory machine readable medium of claim 10, wherein the service node is a first service node that is one of a plurality of service nodes configured as a cluster of service nodes to provide the particular service.

16. The non-transitory machine readable medium of claim 15, wherein the cluster of service nodes is configured in an active-standby configuration in which the first service node is an active service node.

* * * * *